United States Patent
Karg et al.

(10) Patent No.: US 10,564,062 B2
(45) Date of Patent: *Feb. 18, 2020

(54) HUMAN-MACHINE INTERFACE FOR GAS VALVE

(71) Applicant: Honeywell International Inc., Morris Plains, NJ (US)

(72) Inventors: Karen Karg, Champlin, MN (US); Donald J. Kasprzyk, Maple Grove, MN (US); Pallavi Dharwada, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 45 days.

This patent is subject to a terminal disclaimer.

(21) Appl. No.: 15/297,876

(22) Filed: Oct. 19, 2016

(65) Prior Publication Data

US 2018/0106698 A1     Apr. 19, 2018

(51) Int. Cl.
*G01M 3/28*   (2006.01)
*F16K 37/00*  (2006.01)

(52) U.S. Cl.
CPC ....... *G01M 3/2876* (2013.01); *F16K 37/0091* (2013.01); *F23N 2023/08* (2013.01);
(Continued)

(58) Field of Classification Search
CPC .... G01M 3/2876; F16K 37/0091; F23N 1/00; F23N 2023/08; F23N 2025/04;
(Continued)

(56) References Cited

U.S. PATENT DOCUMENTS 156,769 A    11/1874  Cameron
424,581 A     4/1890  Sickels
(Continued)

FOREIGN PATENT DOCUMENTS

DE    3638604 A1    5/1988
DE    3818363 A1    4/1989
(Continued)

OTHER PUBLICATIONS

Communication of a Letter from the Opponent for EP Application No. 12196398.7 dated Feb. 9, 2017.
(Continued)

*Primary Examiner* — Randy W Gibson
*Assistant Examiner* — Gedeon M Kidanu

(57) ABSTRACT

This disclosure relates generally to valves, and more particularly, to gas valve assemblies. In one example, a valve leakage test and/or other tests may be performed on a valve assembly including a valve body with a first valve and a second valve, where the valves may be positioned across a fluid path in the valve body with an intermediate volume between the valves. A human machine interface (HMI) may be in communication with the valve assembly to initiate and/or monitor tests on the valve assembly. The HMI may include a start button on a user interface for initiating the tests on valve assembly. The HMI may receive results of the tests (e.g., valve leakage tests) in real time during the test and display the results of the tests on a display of the HMI in real time.

20 Claims, 15 Drawing Sheets

(52) U.S. Cl.
CPC ...... *F23N 2025/04* (2013.01); *F23N 2035/12* (2013.01); *F23N 2041/08* (2013.01); *F23N 2900/05005* (2013.01)

(58) Field of Classification Search
CPC ............ F23N 2035/12; F23N 2041/08; F23N 2900/05005
See application file for complete search history.

(56) References Cited

U.S. PATENT DOCUMENTS

| | | |
|---|---|---|
| 1,033,204 A | 7/1912 | Skinner |
| 1,147,840 A | 7/1915 | Bowser |
| 1,156,977 A | 10/1915 | Cloos |
| 1,165,315 A | 12/1915 | Cameron |
| 1,206,532 A | 11/1916 | Gray |
| 1,847,385 A | 3/1932 | Dengler |
| 2,093,122 A | 9/1937 | Andrews |
| 2,196,798 A | 4/1940 | Horstmann |
| 2,403,692 A | 7/1946 | Tibbetts |
| 2,791,238 A | 5/1957 | Bryant |
| 2,975,307 A | 3/1961 | Schroeder et al. |
| 3,164,364 A | 1/1965 | McColl |
| 3,202,170 A | 8/1965 | Holbrook |
| 3,304,406 A | 2/1967 | King |
| 3,346,008 A | 10/1967 | Scaramucci |
| 3,381,623 A | 5/1968 | Elliott |
| 3,393,965 A | 7/1968 | Vaughan |
| 3,414,010 A | 12/1968 | Sparrow |
| 3,493,005 A | 2/1970 | Kakegawa |
| 3,641,373 A | 2/1972 | Elkuch |
| 3,646,969 A | 3/1972 | Stampfli |
| 3,744,754 A | 7/1973 | Demi |
| 3,768,955 A | 10/1973 | McLaughlin |
| 3,769,531 A | 10/1973 | Elkuch |
| 3,803,424 A | 4/1974 | Smiley et al. |
| 3,884,226 A | 5/1975 | Tepper |
| 3,947,644 A | 3/1976 | Ushikawa |
| 3,960,364 A | 6/1976 | Hargrave |
| 3,973,576 A | 8/1976 | Dietiker et al. |
| 3,973,976 A | 8/1976 | Boyd |
| 3,993,939 A | 11/1976 | Slavin et al. |
| 4,114,652 A | 9/1978 | Oberle |
| 4,115,036 A | 9/1978 | Paterson |
| 4,140,936 A | 2/1979 | Bullock |
| 4,188,013 A | 2/1980 | Battersby et al. |
| 4,188,972 A | 2/1980 | Van Der Zee |
| 4,197,737 A | 4/1980 | Pittman |
| 4,242,080 A | 12/1980 | Tabei |
| 4,277,832 A | 7/1981 | Wong |
| 4,360,955 A | 11/1982 | Block |
| 4,402,340 A | 9/1983 | Lockwood, Jr. |
| 4,406,131 A | 9/1983 | Weasel, Jr. |
| 4,418,886 A | 12/1983 | Holzer |
| 4,442,853 A | 4/1984 | Gort |
| 4,450,868 A | 5/1984 | Duval et al. |
| 4,453,169 A | 6/1984 | Martner |
| 4,478,076 A | 10/1984 | Bohrer |
| 4,478,077 A | 10/1984 | Bohrer et al. |
| 4,481,776 A | 11/1984 | Araki et al. |
| 4,493,303 A | 1/1985 | Thompson et al. |
| 4,498,850 A | 2/1985 | Perlov et al. |
| 4,501,144 A | 2/1985 | Higashi et al. |
| 4,539,575 A | 9/1985 | Nilsson |
| 4,543,974 A | 10/1985 | Dietiker et al. |
| 4,576,050 A | 3/1986 | Lambert |
| 4,581,624 A | 4/1986 | O'Connor |
| 4,581,707 A | 4/1986 | Millar |
| 4,585,209 A | 4/1986 | Aine et al. |
| 4,619,438 A | 10/1986 | Coffee |
| 4,622,699 A | 11/1986 | Spriggs |
| 4,622,999 A | 11/1986 | Ray |
| 4,628,499 A | 12/1986 | Hammett |
| 4,645,450 A | 2/1987 | West |
| 4,651,564 A | 3/1987 | Johnson et al. |
| 4,654,546 A | 3/1987 | Kirjavainen |
| 4,698,015 A | 10/1987 | Brunel |
| 4,722,360 A | 2/1988 | Odajima et al. |
| 4,756,508 A | 7/1988 | Giachino et al. |
| 4,815,699 A | 3/1989 | Mueller |
| 4,821,999 A | 4/1989 | Ohtaka |
| 4,829,826 A | 5/1989 | Valentin et al. |
| 4,835,717 A | 5/1989 | Michel et al. |
| 4,836,247 A | 6/1989 | Chuang |
| 4,898,200 A | 2/1990 | Odajima et al. |
| 4,911,616 A | 3/1990 | Laumann, Jr. |
| 4,915,613 A | 4/1990 | Landis |
| 4,938,742 A | 7/1990 | Smits |
| 4,939,405 A | 7/1990 | Okuyama et al. |
| 5,022,435 A | 6/1991 | Jaw-Shiunn |
| 5,057,822 A | 10/1991 | Hoffman |
| 5,065,978 A | 11/1991 | Albarda et al. |
| 5,069,419 A | 12/1991 | Jerman |
| 5,070,252 A | 12/1991 | Castenschiold et al. |
| 5,078,581 A | 1/1992 | Blum et al. |
| 5,082,242 A | 1/1992 | Bonne et al. |
| 5,082,246 A | 1/1992 | Stanley et al. |
| 5,085,562 A | 2/1992 | Van Lintel |
| 5,096,388 A | 3/1992 | Weinberg |
| 5,129,794 A | 7/1992 | Beattty |
| 5,146,941 A | 9/1992 | Statler |
| 5,148,074 A | 9/1992 | Fujita et al. |
| 5,171,132 A | 12/1992 | Miyazaki et al. |
| 5,176,358 A | 1/1993 | Bonne et al. |
| 5,180,288 A | 1/1993 | Richter et al. |
| 5,180,623 A | 1/1993 | Ohnstein |
| 5,186,054 A | 2/1993 | Sekimura |
| 5,190,068 A | 3/1993 | Philbin |
| 5,192,197 A | 3/1993 | Culp |
| 5,193,993 A | 3/1993 | Dietiker |
| 5,199,456 A | 4/1993 | Love et al. |
| 5,199,462 A | 4/1993 | Baker |
| 5,203,688 A | 4/1993 | Dietiker |
| 5,205,323 A | 4/1993 | Baker |
| 5,206,557 A | 4/1993 | Bobbio |
| 5,215,112 A | 6/1993 | Davison |
| 5,215,115 A | 6/1993 | Dietiker |
| 5,219,278 A | 6/1993 | van Lintel |
| 5,224,843 A | 7/1993 | Van Lintel |
| 5,244,527 A | 9/1993 | Aoyagi |
| 5,244,537 A | 9/1993 | Ohnstein |
| 5,263,514 A | 11/1993 | Reeves |
| 5,294,089 A | 3/1994 | LaMarca |
| 5,322,258 A | 6/1994 | Bosch et al. |
| 5,323,999 A | 6/1994 | Bonne |
| 5,325,880 A | 7/1994 | Johnson et al. |
| 5,336,062 A | 8/1994 | Richter |
| 5,368,571 A | 11/1994 | Horres, Jr. |
| 5,388,607 A | 2/1995 | Ramaker et al. |
| 5,441,597 A | 8/1995 | Bonne et al. |
| 5,449,142 A | 9/1995 | Banick |
| 5,452,878 A | 9/1995 | Gravesen et al. |
| 5,460,196 A | 10/1995 | Yonnet |
| 5,477,877 A | 12/1995 | Schulze et al. |
| 5,499,909 A | 3/1996 | Yamada et al. |
| 5,513,611 A | 5/1996 | Ricouard et al. |
| 5,520,533 A | 5/1996 | Vrolijk |
| 5,526,172 A | 6/1996 | Kanack |
| 5,529,465 A | 6/1996 | Zengerle et al. |
| 5,536,963 A | 7/1996 | Polla |
| 5,538,220 A | 7/1996 | LaMarca |
| 5,541,465 A | 7/1996 | Higuchi et al. |
| 5,552,654 A | 9/1996 | Konno et al. |
| 5,565,832 A | 10/1996 | Haller et al. |
| 5,571,401 A | 11/1996 | Lewis et al. |
| 5,580,444 A | 12/1996 | Burrows |
| 5,590,235 A | 12/1996 | Rappenecker et al. |
| 5,621,164 A | 4/1997 | Woodbury et al. |
| 5,642,015 A | 6/1997 | Whitehead et al. |
| 5,676,342 A | 10/1997 | Otto et al. |
| 5,683,159 A | 11/1997 | Johnson |
| 5,685,707 A | 11/1997 | Ramsdell et al. |
| 5,696,662 A | 12/1997 | Bauhahn |
| 5,725,363 A | 3/1998 | Bustgens et al. |

(56) References Cited

U.S. PATENT DOCUMENTS

| | | | |
|---|---|---|---|
| 5,735,503 A | 4/1998 | Hietkamp | |
| 5,741,978 A | 4/1998 | Gudmundsson | |
| 5,748,432 A | 5/1998 | Przywozny et al. | |
| 5,755,259 A | 5/1998 | Schulze et al. | |
| 5,759,014 A | 6/1998 | Van Lintel | |
| 5,759,015 A | 6/1998 | Van Lintel et al. | |
| 5,769,043 A | 6/1998 | Nitikiewicz | |
| 5,774,372 A | 6/1998 | Berwanger | |
| 5,790,420 A | 8/1998 | Lang | |
| 5,792,957 A | 8/1998 | Luder et al. | |
| 5,795,469 A * | 8/1998 | Quinn | B01D 15/163 210/198.2 |
| 5,797,358 A | 8/1998 | Brandt et al. | |
| 5,808,205 A | 9/1998 | Romo | |
| 5,822,170 A | 10/1998 | Cabuz et al. | |
| 5,827,950 A * | 10/1998 | Woodbury | F23N 5/242 73/40.5 R |
| 5,836,750 A | 11/1998 | Cabuz | |
| 5,839,467 A | 11/1998 | Saaski et al. | |
| 5,847,523 A | 12/1998 | Rappenecker et al. | |
| 5,861,546 A * | 1/1999 | Sagi | G01F 1/44 137/599.13 |
| 5,863,708 A | 1/1999 | Zanzucchi et al. | |
| 5,887,847 A | 3/1999 | Holborow | |
| 5,893,389 A | 4/1999 | Cunningham | |
| 5,901,939 A | 5/1999 | Cabuz et al. | |
| 5,911,872 A | 6/1999 | Lewis et al. | |
| 5,918,852 A | 7/1999 | Otto | |
| 5,933,573 A | 8/1999 | Lukenich et al. | |
| 5,944,257 A | 8/1999 | Dietiker et al. | |
| 5,954,079 A | 9/1999 | Barth et al. | |
| 5,954,089 A | 9/1999 | Seymour | |
| 5,957,158 A | 9/1999 | Volz et al. | |
| 5,959,448 A | 9/1999 | Baranski et al. | |
| 5,967,124 A | 10/1999 | Cook et al. | |
| 5,971,355 A | 10/1999 | Biegelsen et al. | |
| 5,982,274 A | 11/1999 | Stetler et al. | |
| 5,986,573 A | 11/1999 | Franklin et al. | |
| 6,003,552 A | 12/1999 | Shank et al. | |
| 6,021,652 A | 2/2000 | Walker | |
| 6,050,281 A | 4/2000 | Adams et al. | |
| 6,057,771 A | 5/2000 | Lakra | |
| 6,077,068 A | 6/2000 | Okumura | |
| 6,106,245 A | 8/2000 | Cabuz | |
| 6,109,889 A | 8/2000 | Zengerle et al. | |
| 6,116,863 A | 9/2000 | Ahn et al. | |
| 6,122,973 A | 9/2000 | Nomura et al. | |
| 6,151,967 A | 11/2000 | McIntosh et al. | |
| 6,152,168 A | 11/2000 | Ohmi et al. | |
| 6,155,531 A | 12/2000 | Holborow et al. | |
| 6,167,761 B1 | 1/2001 | Hanzawa et al. | |
| 6,176,247 B1 | 1/2001 | Winchcomb et al. | |
| 6,179,000 B1 | 1/2001 | Zdobinski et al. | |
| 6,179,586 B1 | 1/2001 | Herb et al. | |
| 6,182,941 B1 | 2/2001 | Scheurenbrand et al. | |
| 6,184,607 B1 | 2/2001 | Cabuz et al. | |
| 6,189,568 B1 | 2/2001 | Bergum et al. | |
| 6,207,954 B1 * | 3/2001 | Andrien, Jr. | H01J 49/0009 250/282 |
| 6,213,758 B1 | 4/2001 | Tesar et al. | |
| 6,215,221 B1 | 4/2001 | Cabuz et al. | |
| 6,240,944 B1 | 6/2001 | Ohnstein et al. | |
| 6,242,909 B1 | 6/2001 | Dorsey et al. | |
| 6,247,919 B1 | 6/2001 | Welz, Jr. et al. | |
| 6,255,609 B1 | 7/2001 | Samuelson et al. | |
| 6,263,908 B1 | 7/2001 | Love et al. | |
| 6,288,472 B1 | 9/2001 | Cabuz et al. | |
| 6,297,640 B1 | 10/2001 | Hayes | |
| 6,321,781 B1 | 11/2001 | Kurth | |
| 6,360,773 B1 | 3/2002 | Rhodes | |
| 6,373,682 B1 | 4/2002 | Goodwin-Johansson | |
| 6,386,234 B2 | 5/2002 | Sontag | |
| 6,390,027 B1 | 5/2002 | Lyons et al. | |
| 6,397,798 B1 | 6/2002 | Fiaccabrino | |
| 6,401,753 B2 | 6/2002 | Neu | |
| 6,418,793 B1 | 7/2002 | Pechoux et al. | |
| 6,445,053 B1 | 9/2002 | Cho | |
| 6,450,200 B1 | 9/2002 | Ollivier | |
| 6,460,567 B1 | 10/2002 | Hansen, III et al. | |
| 6,463,546 B1 | 10/2002 | Jeske et al. | |
| 6,496,348 B2 | 12/2002 | McIntosh | |
| 6,496,786 B1 | 12/2002 | Dieterle et al. | |
| 6,505,838 B1 | 1/2003 | Cavaliere | |
| 6,508,528 B2 | 1/2003 | Fujii et al. | |
| 6,520,753 B1 | 2/2003 | Grosjean et al. | |
| 6,533,574 B1 | 3/2003 | Pechoux | |
| 6,536,287 B2 | 3/2003 | Beekhuizen et al. | |
| 6,537,060 B2 | 3/2003 | Vegter | |
| 6,547,554 B2 | 4/2003 | Koegl et al. | |
| 6,550,495 B1 | 4/2003 | Schulze | |
| 6,553,979 B2 | 4/2003 | Albright | |
| 6,561,791 B1 | 5/2003 | Vrolijk et al. | |
| 6,563,233 B1 | 5/2003 | Hinks | |
| 6,564,824 B2 | 5/2003 | Lowery et al. | |
| 6,571,817 B1 | 6/2003 | Bohan, Jr. | |
| 6,572,077 B1 | 6/2003 | Worner | |
| 6,579,087 B1 | 6/2003 | Vrolijk | |
| 6,584,852 B2 | 7/2003 | Suzuki et al. | |
| 6,590,267 B1 | 7/2003 | Goodwin-Johansson et al. | |
| 6,606,911 B2 | 8/2003 | Akiyama et al. | |
| 6,619,388 B2 | 9/2003 | Dietz et al. | |
| 6,619,612 B2 | 9/2003 | Freisinger et al. | |
| 6,623,012 B1 | 9/2003 | Perry et al. | |
| 6,640,642 B1 | 11/2003 | Onose et al. | |
| 6,644,351 B2 | 11/2003 | La Marca et al. | |
| 6,650,211 B2 | 11/2003 | Pimouguet | |
| 6,651,506 B2 | 11/2003 | Lee et al. | |
| 6,651,636 B1 | 11/2003 | Albright | |
| 6,651,954 B1 | 11/2003 | Porcher et al. | |
| 6,655,409 B1 | 12/2003 | Steenburgh et al. | |
| 6,655,652 B2 | 12/2003 | Meinhof | |
| 6,658,928 B1 | 12/2003 | Pollack et al. | |
| 6,676,580 B2 | 1/2004 | Tsai et al. | |
| 6,704,186 B2 | 3/2004 | Ishikura | |
| 6,725,167 B2 | 4/2004 | Grumstrup et al. | |
| 6,728,600 B1 | 4/2004 | Contaldo et al. | |
| 6,729,601 B2 | 5/2004 | Freisinger et al. | |
| 6,742,541 B2 | 6/2004 | Pimouguet | |
| 6,768,406 B1 | 7/2004 | Fiaccabrino | |
| 6,796,326 B2 | 9/2004 | Bayer | |
| 6,813,954 B2 | 11/2004 | Gokhfeld | |
| 6,814,102 B2 | 11/2004 | Hess et al. | |
| 6,814,339 B2 | 11/2004 | Berger et al. | |
| 6,819,208 B1 | 11/2004 | Peghaire et al. | |
| 6,820,650 B2 | 11/2004 | Solet et al. | |
| 6,825,632 B2 | 11/2004 | Hahn et al. | |
| 6,826,947 B2 | 12/2004 | Solet et al. | |
| 6,851,298 B2 | 2/2005 | Miura et al. | |
| 6,874,367 B2 | 4/2005 | Jakobsen | |
| 6,877,380 B2 | 4/2005 | Lewis | |
| 6,877,383 B2 | 4/2005 | Horie et al. | |
| 6,880,548 B2 | 4/2005 | Schultz et al. | |
| 6,880,567 B2 | 4/2005 | Klaver et al. | |
| 6,885,184 B1 | 4/2005 | Gofman | |
| 6,888,354 B1 | 5/2005 | Gofman | |
| 6,889,705 B2 | 5/2005 | Newman et al. | |
| 6,892,756 B2 | 5/2005 | Schulze | |
| 6,903,526 B2 | 6/2005 | Weisser et al. | |
| 6,906,484 B1 | 6/2005 | Berroth et al. | |
| 6,918,756 B2 | 7/2005 | Fredricks et al. | |
| 6,923,069 B1 | 8/2005 | Stewart | |
| 6,949,903 B2 | 9/2005 | Berroth et al. | |
| 6,956,340 B2 | 10/2005 | Schondelmaier et al. | |
| 6,956,343 B2 | 10/2005 | Berroth et al. | |
| 6,968,851 B2 | 11/2005 | Ramirez et al. | |
| 6,981,426 B2 | 1/2006 | Wang et al. | |
| 6,983,759 B2 | 1/2006 | Maichel et al. | |
| 6,984,122 B2 | 1/2006 | Sullivan et al. | |
| 6,994,308 B1 | 2/2006 | Wang et al. | |
| 6,997,684 B2 | 2/2006 | Hahn et al. | |
| 7,000,635 B2 | 2/2006 | Erbe et al. | |
| 7,004,034 B2 | 2/2006 | Chen | |
| 7,036,791 B2 | 5/2006 | Wiese | |
| 7,039,502 B2 | 5/2006 | Berwanger et al. | |

(56) References Cited

U.S. PATENT DOCUMENTS

| | | |
|---|---|---|
| 7,048,536 B2 | 5/2006 | Sullivan et al. |
| 7,066,203 B2 | 6/2006 | Baarda |
| 7,082,835 B2 | 8/2006 | Cook et al. |
| 7,089,086 B2 | 8/2006 | Schoonover |
| 7,089,959 B2 | 8/2006 | Cai |
| 7,093,611 B2 | 8/2006 | Murray et al. |
| 7,101,172 B2 | 9/2006 | Jaeschke |
| 7,107,820 B2 | 9/2006 | Nunnally et al. |
| 7,119,504 B2 | 10/2006 | Dornhof |
| 7,121,525 B2 | 10/2006 | Gelez |
| 7,174,771 B2 | 2/2007 | Cooper |
| 7,216,547 B1 | 5/2007 | Stewart et al. |
| 7,223,094 B2 | 5/2007 | Goebel |
| 7,225,056 B2 | 5/2007 | Bolduan et al. |
| 7,249,610 B2 | 7/2007 | Moses |
| 7,260,994 B2 | 8/2007 | Oboodi et al. |
| 7,290,902 B2 | 11/2007 | Suehiro et al. |
| 7,297,640 B2 | 11/2007 | Xie et al. |
| 7,302,863 B2 | 12/2007 | Kielb et al. |
| 7,319,300 B2 | 1/2008 | Hahn |
| 7,328,719 B2 | 2/2008 | Madden |
| 7,347,221 B2 | 3/2008 | Berger et al. |
| 7,360,751 B2 | 4/2008 | Herrfurth |
| 7,390,172 B2 | 6/2008 | Winkler |
| 7,402,038 B2 | 7/2008 | Neville et al. |
| 7,402,925 B2 | 7/2008 | Best et al. |
| 7,405,609 B2 | 7/2008 | Krotsch |
| 7,422,028 B2 | 9/2008 | Nugent et al. |
| 7,451,600 B2 | 11/2008 | Patel et al. |
| 7,451,644 B2 | 11/2008 | Karte |
| 7,453,696 B2 | 11/2008 | Tungl et al. |
| 7,461,828 B2 | 12/2008 | Kidprasert |
| 7,493,822 B2 | 2/2009 | Stewart et al. |
| 7,503,221 B2 | 3/2009 | Wade |
| 7,504,961 B2 | 3/2009 | Flanders |
| 7,537,019 B2 | 5/2009 | Ting et al. |
| 7,543,604 B2 | 6/2009 | Benda |
| 7,553,151 B2 | 6/2009 | O'Mara et al. |
| 7,554,279 B2 | 6/2009 | Loffler et al. |
| 7,556,238 B2 | 7/2009 | Seberger |
| 7,574,896 B1 | 8/2009 | Cooper |
| 7,586,228 B2 | 9/2009 | Best |
| 7,586,276 B2 | 9/2009 | Domhof |
| 7,624,755 B2 | 12/2009 | Benda et al. |
| 7,627,455 B2 | 12/2009 | Lenz et al. |
| 7,644,731 B2 | 1/2010 | Benda et al. |
| 7,647,842 B1 | 1/2010 | Killian et al. |
| 7,647,940 B2 | 1/2010 | Minervini et al. |
| 7,669,461 B2 | 3/2010 | Kates et al. |
| 7,688,011 B2 | 3/2010 | Berroth et al. |
| 7,715,168 B2 | 5/2010 | Gofman et al. |
| 7,735,509 B2 | 6/2010 | Galloway et al. |
| 7,740,024 B2 | 6/2010 | Brodeur et al. |
| 7,759,884 B2 | 7/2010 | Dufner et al. |
| 7,811,069 B2 | 10/2010 | Fleig |
| 7,812,488 B2 | 10/2010 | Cosco et al. |
| 7,816,813 B2 | 10/2010 | Yagudayev et al. |
| 7,841,541 B2 | 11/2010 | Ardelt et al. |
| 7,869,971 B2 | 1/2011 | Varga |
| 7,880,421 B2 | 2/2011 | Karwath |
| 7,880,427 B2 | 2/2011 | Foll et al. |
| 7,890,216 B2 | 2/2011 | Boger et al. |
| 7,890,276 B2 | 2/2011 | Killion et al. |
| 7,891,972 B2 | 2/2011 | Blank et al. |
| 7,898,372 B2 | 3/2011 | Melchionne, Jr. |
| 7,902,776 B2 | 3/2011 | Karwath |
| 7,905,251 B2 | 3/2011 | Flanders |
| 7,922,481 B2 | 4/2011 | Geiger et al. |
| 7,940,189 B2 | 5/2011 | Brown |
| 8,020,585 B2* | 9/2011 | Shock ............... F17D 5/02 137/554 |
| 8,024,978 B2 | 9/2011 | Khemet et al. |
| 8,036,837 B2 | 10/2011 | Wilke |
| 8,061,212 B2 | 11/2011 | Shubert |
| 8,066,255 B2 | 11/2011 | Wang |
| 8,099,248 B2 | 1/2012 | Umekage et al. |
| 8,104,510 B2 | 1/2012 | Ams et al. |
| 8,109,289 B2 | 2/2012 | Trnka et al. |
| 8,126,631 B2 | 2/2012 | Scalia, Jr. |
| 8,201,572 B2 | 6/2012 | Segal |
| 8,205,484 B2 | 6/2012 | Sasaki |
| 8,212,507 B2 | 7/2012 | Wystup et al. |
| 8,225,814 B2 | 7/2012 | Igarashi |
| 8,235,064 B2 | 8/2012 | Kasprzyk et al. |
| 8,240,636 B2 | 8/2012 | Smith |
| 8,258,660 B2 | 9/2012 | Strobel et al. |
| 8,265,794 B2 | 9/2012 | Minervini et al. |
| 8,271,141 B2 | 9/2012 | Cummings et al. |
| 8,286,937 B2 | 10/2012 | Forster |
| 8,297,948 B2 | 10/2012 | Laufer et al. |
| 8,303,297 B2 | 11/2012 | Tompkins et al. |
| 8,307,845 B2 | 11/2012 | Kouchi et al. |
| 8,319,461 B2 | 11/2012 | Wystup et al. |
| 8,353,281 B2 | 1/2013 | Oberhomburg et al. |
| 8,380,448 B2 | 2/2013 | Franklin |
| 8,381,760 B2 | 2/2013 | Santinanavat et al. |
| 8,387,441 B2 | 3/2013 | Falta et al. |
| 8,414,774 B2* | 4/2013 | LaMarr ............... G01N 30/24 210/141 |
| 8,424,563 B2 | 4/2013 | Haller et al. |
| 8,473,229 B2 | 6/2013 | Kucera et al. |
| 8,500,441 B2 | 8/2013 | Geiger et al. |
| 8,539,972 B2 | 9/2013 | Xu |
| 8,567,757 B2 | 10/2013 | Pitchford et al. |
| 8,596,957 B2 | 12/2013 | Seebauer |
| 8,636,501 B2 | 1/2014 | Geiger et al. |
| 8,639,464 B2 | 1/2014 | Artiuch et al. |
| 8,677,913 B2 | 3/2014 | Kastingschafer et al. |
| 8,721,325 B2 | 5/2014 | Geiger et al. |
| 8,746,275 B2 | 6/2014 | Santinanavat et al. |
| 8,839,815 B2 | 9/2014 | Young et al. |
| 8,850,880 B2 | 10/2014 | Puttmer |
| 8,899,264 B2 | 12/2014 | Young et al. |
| 8,905,063 B2 | 12/2014 | Young et al. |
| 8,947,242 B2 | 2/2015 | Kucera et al. |
| 8,961,169 B2 | 2/2015 | Newby et al. |
| 9,020,765 B2 | 4/2015 | Seebauer |
| 9,074,770 B2 | 7/2015 | Young et al. |
| 9,109,610 B2 | 8/2015 | Streng et al. |
| 9,234,661 B2 | 1/2016 | Young et al. |
| 2001/0003917 A1* | 6/2001 | Sagi .................. G01M 3/04 73/40 |
| 2002/0029808 A1 | 3/2002 | Friend et al. |
| 2002/0175791 A1 | 11/2002 | LaMarca et al. |
| 2003/0167851 A1 | 9/2003 | Parker |
| 2004/0035211 A1 | 2/2004 | Pinto et al. |
| 2004/0173007 A1* | 9/2004 | McCoy ............... G01M 3/229 73/40.7 |
| 2005/0199286 A1 | 9/2005 | Appleford et al. |
| 2005/0279956 A1 | 12/2005 | Berger et al. |
| 2006/0226299 A1 | 10/2006 | Tungl et al. |
| 2006/0243334 A1 | 11/2006 | Brochhaus et al. |
| 2006/0272712 A1 | 12/2006 | Sontag |
| 2006/0278281 A1 | 12/2006 | Gynz-Rekowski et al. |
| 2007/0024255 A1 | 2/2007 | Yasumura |
| 2007/0068511 A1 | 3/2007 | Bachinsky et al. |
| 2007/0089789 A1 | 4/2007 | Mudd et al. |
| 2007/0164243 A1 | 7/2007 | Volz |
| 2007/0256478 A1* | 11/2007 | Guadagnola ........ G01M 3/3254 73/40 |
| 2008/0065355 A1* | 3/2008 | Bredau ............... F15B 19/005 702/183 |
| 2008/0099082 A1 | 5/2008 | Moenkhaus |
| 2008/0157707 A1 | 7/2008 | Jeske et al. |
| 2008/0318098 A1 | 12/2008 | Matsunaga |
| 2009/0068503 A1 | 3/2009 | Yamazaki et al. |
| 2009/0120338 A1 | 5/2009 | Adendorf et al. |
| 2009/0126798 A1 | 5/2009 | Mather |
| 2009/0142717 A1 | 6/2009 | Lavelle |
| 2009/0197212 A1 | 8/2009 | Masen |
| 2009/0280989 A1 | 11/2009 | Astra et al. |
| 2009/0288399 A1 | 11/2009 | Fayard |
| 2009/0303076 A1 | 12/2009 | Setiadi et al. |
| 2010/0112500 A1 | 5/2010 | Maiello et al. |

(56) References Cited

U.S. PATENT DOCUMENTS

| | | | |
|---|---|---|---|
| 2010/0126610 A1* | 5/2010 | Diprima | F17D 5/06 137/624.11 |
| 2010/0146939 A1 | 6/2010 | Sim et al. | |
| 2011/0039217 A1 | 2/2011 | Happe | |
| 2011/0041483 A1 | 2/2011 | Kapparos | |
| 2011/0240157 A1 | 10/2011 | Jones et al. | |
| 2011/0266473 A1* | 11/2011 | Santinanavat | F23N 1/002 251/30.01 |
| 2012/0107753 A1 | 5/2012 | Kemp | |
| 2013/0152673 A1* | 6/2013 | Young | F23N 1/002 73/40.7 |
| 2013/0153036 A1* | 6/2013 | Young | F16K 37/0033 137/1 |
| 2013/0153041 A1* | 6/2013 | Kucera | F23N 1/005 137/14 |
| 2013/0153042 A1* | 6/2013 | Young | F23N 1/005 137/14 |
| 2013/0153798 A1 | 6/2013 | Kucera et al. | |
| 2013/0154841 A1* | 6/2013 | Kucera | F16K 37/0091 340/605 |
| 2013/0288355 A1* | 10/2013 | DeWitte | G01N 30/06 435/288.6 |
| 2013/0325371 A1 | 12/2013 | Brine et al. | |
| 2014/0096850 A1 | 4/2014 | Filkovski et al. | |
| 2014/0147878 A1* | 5/2014 | Herman | G01N 33/82 435/29 |
| 2015/0045971 A1 | 2/2015 | Endel et al. | |
| 2015/0051848 A1* | 2/2015 | Jurkowitz, Jr. | H04B 7/26 702/50 |
| 2015/0107675 A1 | 4/2015 | Kucera | |
| 2016/0069473 A1* | 3/2016 | Kucera | F16K 37/0041 137/637 |
| 2016/0123584 A1 | 5/2016 | Young et al. | |
| 2017/0046043 A1* | 2/2017 | Karg | F16K 37/0025 |

FOREIGN PATENT DOCUMENTS

| | | |
|---|---|---|
| DE | 19617852 A1 | 10/1997 |
| DE | 19824521 A1 | 12/1999 |
| DE | 102005033611 B3 | 10/2006 |
| EP | 0062854 A1 | 10/1982 |
| EP | 0068517 B1 | 1/1986 |
| EP | 0275439 A1 | 7/1988 |
| EP | 0282758 A2 | 9/1988 |
| EP | 0356690 A1 | 3/1990 |
| EP | 0522479 A2 | 1/1993 |
| EP | 0563787 A1 | 10/1993 |
| EP | 0617234 A1 | 9/1994 |
| EP | 0645562 A1 | 3/1995 |
| EP | 0652501 A2 | 5/1995 |
| EP | 0664422 A1 | 7/1995 |
| EP | 0665396 A1 | 8/1995 |
| EP | 0678178 A1 | 10/1995 |
| EP | 0744821 A2 | 11/1996 |
| EP | 0757200 A2 | 2/1997 |
| EP | 0822376 A2 | 2/1998 |
| EP | 0817931 B1 | 12/1998 |
| EP | 0881435 A1 | 12/1998 |
| EP | 0896191 A2 | 2/1999 |
| EP | 0896192 A2 | 2/1999 |
| EP | 0907052 A2 | 4/1999 |
| EP | 0817934 B1 | 8/1999 |
| EP | 0952357 A1 | 10/1999 |
| EP | 0976957 A2 | 2/2000 |
| EP | 1031792 A2 | 8/2000 |
| EP | 1069357 A2 | 1/2001 |
| EP | 1073192 A2 | 1/2001 |
| EP | 1084357 A2 | 3/2001 |
| EP | 1084358 A1 | 3/2001 |
| EP | 1121511 A1 | 8/2001 |
| EP | 1176317 A1 | 1/2002 |
| EP | 1186779 A1 | 3/2002 |
| EP | 1157205 B1 | 9/2002 |
| EP | 0992658 B1 | 5/2003 |
| EP | 1323966 A1 | 7/2003 |
| EP | 1078187 B1 | 8/2003 |
| EP | 1382907 A1 | 1/2004 |
| EP | 1403885 A2 | 3/2004 |
| EP | 1269054 B1 | 8/2004 |
| EP | 1484509 A1 | 12/2004 |
| EP | 1191676 B1 | 1/2005 |
| EP | 1275039 B1 | 1/2005 |
| EP | 1446607 B1 | 3/2005 |
| EP | 1510756 A1 | 3/2005 |
| EP | 1299665 B1 | 4/2005 |
| EP | 1324496 B1 | 6/2005 |
| EP | 0751350 B1 | 9/2005 |
| EP | 1584870 A2 | 10/2005 |
| EP | 1243857 B1 | 12/2005 |
| EP | 1282798 B1 | 12/2005 |
| EP | 1424708 B1 | 12/2005 |
| EP | 0843287 B1 | 2/2006 |
| EP | 1346463 B1 | 3/2006 |
| EP | 1535388 B1 | 6/2006 |
| EP | 1703140 A1 | 9/2006 |
| EP | 1703146 A2 | 9/2006 |
| EP | 1183772 B1 | 10/2006 |
| EP | 1303718 B1 | 10/2006 |
| EP | 1314240 B1 | 10/2006 |
| EP | 1715229 A2 | 10/2006 |
| EP | 1256763 B1 | 11/2006 |
| EP | 1727268 A2 | 11/2006 |
| EP | 1559936 B1 | 12/2006 |
| EP | 1748534 A2 | 1/2007 |
| EP | 1748545 A2 | 1/2007 |
| EP | 1327808 B1 | 2/2007 |
| EP | 1329659 B1 | 2/2007 |
| EP | 1291532 B1 | 6/2007 |
| EP | 1610046 B1 | 6/2007 |
| EP | 1592905 B1 | 7/2007 |
| EP | 1610045 B1 | 7/2007 |
| EP | 1727261 B1 | 10/2007 |
| EP | 1860328 A1 | 11/2007 |
| EP | 1626321 B1 | 2/2008 |
| EP | 1848907 B1 | 4/2008 |
| EP | 1936778 A2 | 6/2008 |
| EP | 1413045 B1 | 7/2008 |
| EP | 1499008 B1 | 10/2008 |
| EP | 1882882 A2 | 10/2008 |
| EP | 1536169 B1 | 11/2008 |
| EP | 1298679 B1 | 12/2008 |
| EP | 1714040 B1 | 12/2008 |
| EP | 2014979 A2 | 1/2009 |
| EP | 1669648 B1 | 2/2009 |
| EP | 2048439 A1 | 4/2009 |
| EP | 1659462 B1 | 6/2009 |
| EP | 2093545 B1 | 8/2009 |
| EP | 2107248 A2 | 10/2009 |
| EP | 2116857 A1 | 11/2009 |
| EP | 2119946 A1 | 11/2009 |
| EP | 1370787 B1 | 3/2010 |
| EP | 1413044 B1 | 3/2010 |
| EP | 2164164 A1 | 3/2010 |
| EP | 2177796 A2 | 4/2010 |
| EP | 2178201 A1 | 4/2010 |
| EP | 1970610 B1 | 5/2010 |
| EP | 2197101 | 6/2010 |
| EP | 2068056 B1 | 8/2010 |
| EP | 1712800 B1 | 10/2010 |
| EP | 2118493 B1 | 10/2010 |
| EP | 2242344 A1 | 10/2010 |
| EP | 1715582 B1 | 11/2010 |
| EP | 1675757 B1 | 12/2010 |
| EP | 2267883 A1 | 12/2010 |
| EP | 1703139 B1 | 1/2011 |
| EP | 2286976 A1 | 2/2011 |
| EP | 1596495 B1 | 4/2011 |
| EP | 2212984 B1 | 4/2011 |
| EP | 2306622 A1 | 4/2011 |
| EP | 2010500 B1 | 6/2011 |
| EP | 2113696 B1 | 7/2011 |
| EP | 2604924 B1 | 5/2015 |
| GB | 2099158 A | 12/1982 |

(56) References Cited

FOREIGN PATENT DOCUMENTS

| | | | |
|---|---|---|---|
| GB | 2327750 | A | 2/1999 |
| JP | 02086258 | A | 3/1990 |
| JP | 05219760 | A | 8/1993 |
| JP | 9061284 | A | 3/1997 |
| JP | 9184600 | A | 7/1997 |
| JP | 2004125809 | A | 4/2004 |
| JP | 2004309159 | A | 11/2004 |
| JP | 2008135922 | A | 6/2008 |
| JP | 2008286478 | A | 11/2008 |
| SU | 744877 | B | 6/1980 |
| WO | 8705375 | A1 | 9/1987 |
| WO | 9627095 | A1 | 9/1996 |
| WO | 9729538 | A1 | 8/1997 |
| WO | 9801709 | A2 | 1/1998 |
| WO | 9924758 | A1 | 5/1999 |
| WO | 9960292 | A1 | 11/1999 |
| WO | 9964769 | A2 | 12/1999 |
| WO | 9964770 | A1 | 12/1999 |
| WO | 0028215 | A1 | 5/2000 |
| WO | 0106179 | A1 | 1/2001 |
| WO | 0133078 | A1 | 5/2001 |
| WO | 0161226 | A1 | 8/2001 |
| WO | 0173297 | A2 | 10/2001 |
| WO | 0190617 | A1 | 11/2001 |
| WO | 0204852 | A1 | 1/2002 |
| WO | 02077502 | A1 | 10/2002 |
| WO | 02084156 | A1 | 10/2002 |
| WO | 02086365 | A1 | 10/2002 |
| WO | 02086918 | A1 | 10/2002 |
| WO | 02097840 | A1 | 12/2002 |
| WO | 2004059830 | A2 | 7/2004 |
| WO | 2004070245 | A1 | 8/2004 |
| WO | 2005042313 | A1 | 5/2005 |
| WO | 2005076455 | A1 | 8/2005 |
| WO | 2005076456 | A1 | 8/2005 |
| WO | 2005085652 | A1 | 9/2005 |
| WO | 2005094150 | A1 | 10/2005 |
| WO | 2006000366 | A1 | 1/2006 |
| WO | 2006000367 | A1 | 1/2006 |
| WO | 2006039956 | A1 | 4/2006 |
| WO | 2006042635 | A1 | 4/2006 |
| WO | 2006053816 | A1 | 5/2006 |
| WO | 2006077069 | A1 | 7/2006 |
| WO | 2006088367 | A2 | 8/2006 |
| WO | 2007012419 | A2 | 2/2007 |
| WO | 2007018876 | A1 | 2/2007 |
| WO | 2007093312 | A1 | 8/2007 |
| WO | 2007140927 | A1 | 12/2007 |
| WO | 2008061575 | A1 | 3/2008 |
| WO | 2008039061 | A1 | 4/2008 |
| WO | 2008119404 | A1 | 10/2008 |
| WO | 2008141911 | A1 | 11/2008 |
| WO | 2008148401 | A1 | 12/2008 |
| WO | 2009000481 | A1 | 12/2008 |
| WO | 2009049694 | A1 | 4/2009 |
| WO | 2009065815 | A2 | 5/2009 |
| WO | 2009073510 | A2 | 6/2009 |
| WO | 2009089857 | A1 | 7/2009 |
| WO | 2009126020 | A1 | 10/2009 |
| WO | 2010018192 | A2 | 2/2010 |
| WO | 2010052137 | A2 | 5/2010 |
| WO | 2010056111 | A1 | 5/2010 |
| WO | 2010083877 | A1 | 7/2010 |
| WO | 2011010274 | A1 | 1/2011 |
| WO | 2011026666 | A1 | 3/2011 |
| WO | 2011045776 | A1 | 4/2011 |
| WO | 2011047895 | A1 | 4/2011 |
| WO | 2011051002 | A1 | 5/2011 |
| WO | 2011069805 | A1 | 6/2011 |
| WO | 2011072888 | A1 | 6/2011 |
| WO | 2011092011 | A2 | 8/2011 |
| WO | 2011095928 | A1 | 8/2011 |

OTHER PUBLICATIONS

Office Action for EP Application No. 14194824.0 dated Jun. 23, 2017.
Allgemein Grundlagen und Anforderungen, EN ISO 5167-1, German Translation, Chapter 3.3.6, p. 8, 2003.
International Search Report and Written Opinion for PCT Application No. PCT/US2017/055741, dated Jan. 23, 2018.
"Flexible, Compact and with a High Performance—the New Valvario, G. Kromschroder AG Launches it's New, Improved Series of Gas Fittings," Press Release, 2 pages, 2003.
"Large-Scale Linearization Circuit for Electrostatic Motors" IBM Technical Disclosure Bulletin, IBM Corporation, vol. 37, No. 10, pp. 563-564, Oct. 1, 1994.
ASCO RedHat, "2-Way Normally Closed General Purpose & Watertight Enclosure Gas Shutoff Valves ¾" to 3" NPT, 2/2 Series 8214 (200) AH(E) V710(B)," 6 pages, prior to Dec. 15, 2011.
ASCO RedHat, "2-Way Normally Closed General Purpose & Watertight Enclosure Gas Shutoff Valves ¾" to 3" NPT, 2/2 Series 8214 (200)," 8 pages, prior to Dec. 15, 2011.
ASCO Valve, Inc., "8290 Series Angle Body Piston Valves, Introducing the All New 8290 Assembly Configurator," 12 pages, prior to Dec. 15, 2011.
ASCO, "2-Way Normally Closed V710(B) Valve Body Pipe Sizes ¾" to 3" NPT, Series V710(B)," 4 pages, prior to Dec. 15, 2011.
ASCO, "On/Off General Purpose & Watertight Hydramotor Actuator for Use with V710 Gas Valve Body, Series AH2E," 2 pages, prior to Dec. 15, 2011.
Athavale et al., "Coupled Electrostatics-Structures-Fluidic Simulations of a Bead Mesopump," Proceedings of the International Mechanical Engineers Congress & Exhibition, pp. 1-7, Oct. 1999.
Bertz et al., "Silicon Grooves With Sidewall Angles Down to 1° made by Dry Etching," pp. 331-339, prior to Dec. 29, 2004.
Bonne et al. "Actuation-Based Fuel Gas Microsensors," IGT Symposium on Natural Gas Quality, Energy Measurement, Metering and Utilization Practices, 17 pages, Mar. 2001.
Branebjerg, "A New Electrostatic Actuator Providing Improved Stroke Length and Force," IEEE, pp. 6-11, Feb. 4-7, 1992.
Bustgens et al., "Micropump Manufactured by Thermoplastic Molding," IEEE, pp. 18-21, 1994.
Cabuz et al., "Factors Enhancing the Reliability of Touch-Mode Electrostatic Acuators," Sensors and Actuators 79, pp. 245-250, 2000.
Cabuz et al., "Mesoscopic Sampler Based on 3D Array of Electrostatically Activated Diaphragms," Proceedings of the 10th Int. Conf. on Solid-State Sensors and Actuators, Transducers 1999.
Cabuz et al., "The Dual Diaphragm Pump," 4 pages prior to Dec. 29, 2004.
Cabuz, "Dielectric Related Effects in Micromachined Electrostatic Actuators," IEEE, 1999 Conference on Electrical Insulation and Dielectric Phenomena, pp. 327-332, 1999.
Cabuz, "Electrical Phenomena at the Interface of Rolling-Contact, Electrostatic Actuators," 16 pages, prior to Dec. 29, 2004.
Cabuz, et al., "High Reliability Touch-Mode Electrostatic Actuators", Technical Digest of the Solid State Sensor and Actuator Workshop, Hilton Head, S.C., pp. 296-299, Jun. 8-11, 1998.
Cabuz. "Tradeoffs in MEMS Materials," SPIE, vol. 2881, pp. 160-170, prior to Dec. 29, 2004.
Carlisle, "10 Tips on Valve-Proving Systems," Karl Dungs Inc., 5 pages, Aug. 1, 2002, printed May 23, 2012.
European Search Report for EP Application No. 12196394.6 dated May 23, 2013.
European Search Report for EP Application No. 12196396.1 dated Jun. 11, 2013.
European Search Report for EP Application No. 12196398.7 dated Jun. 11, 2013.
Examination Report for EP Application No. 12196398.7, dated Apr. 11, 2014.
CSA, "B149.3S1-07 Supplement No. 1 to CAN/CAS-B149.3-05 Code for the Field Approval of Fuel-Related Components on Appliances and Equipment," 40 pages, Jan. 2007.
Dungs Combustion Controls, "Double Solenoid Valve Combined Pressure Regulator and Safety Valves Infinitely Variable Operating Mode, MBC- . . . -VEF DN65—DN100," 8 pages, prior to Dec. 15, 2011.

(56) References Cited

OTHER PUBLICATIONS

Dungs Combustion Controls, "Double Solenoid Valve Combined Pressure Regulator and Safety Valves Servo Pressure Regulator, MBC- . . . -SE DN 65 DN 125," 8 pages, prior to Dec. 15, 2011.
Dungs Combustion Controls, "Double Solenoid Valve Control and Safety Combination Valve Servo Pressure Controller, DMV-SE 507/11-525/11," 8 pages, prior to Dec. 15, 2011.
Dungs Combustion Controls, "Double Solenoid Valve Regulator and Safety Combination Infinitely Variable Floating Operation, DMV-VEF 507-525," 8 pages, prior to Dec. 15, 2011.
Dungs Combustion Controls, "Gas/Air Ratio Control MB-VEF, DMV-VEF," 15 pages, prior to Dec. 15, 2011.
Dungs Combustion Controls, "GasMultiBloc Combined Regulator and Safety Shut-Off Valves Two-Stage Function, MB-ZRD(LE) 415-420 B01," pp. 1-6, prior to Dec. 15, 2011.
Dungs Combustion Controls, "GasMultiBloc Combined Regulator and Safety Valve Infinitely Variable Air/Gas Ratio Control Mode, MBC-300-VEF, MBC-700-VEF, MBC-1200-VEF," 8 pages, prior to Dec. 15, 2011.
Dungs Combustion Controls, "GasMultiBloc Combined Servo Pressure Regulator and Safety Shut-Off Valves, MBC-300-SE, MBC-700-SE, MBC-1200-SE, MBC-300-N, MBC-700-N," 8 pages, prior to Dec. 15, 2011.
Dungs Combustion Controls, "Pressure Regulator FRN Zero Pressure Regulator," 4 pages, prior to Dec. 15, 2011.
Dungs Combustion Controls, "Pressure Regulator FRS," 6 pages prior to Dec. 15, 2011.
Dungs Combustion Controls, "Pressure Regulator FRU Circulation Regulator," 4 pages, prior to Dec. 15, 2011.
Dungs Combustion Controls, "Pressure Switch for Gas, Air, Flue Gases and Combustion Products, GW 500 A4, GW 500 A4/2" 6 pages, prior to Dec. 15, 2011.
Dungs Combustion Controls, "Program," 4 pages, prior to Dec. 15, 2011.
Dungs Combustion Controls, "Valve Testing System VPS 504 for Multiple Actuators," 12 pages, prior to Dec. 15, 2011.
Dungs Combustion Controls, "Valve Testing System VPS 508 for Multiple Actuators," 12 pages, prior to Dec. 15, 2011.
Freund et al., "A Chemically Diverse Conducting Polymer-Based 'Electronic Nose'," Proceedings of the National Academy of Sciences of the United States of America, vol. 92, No. 7, pp. 2652-2656, Mar. 28, 1995.
Halg, "On a Nonvolatile Memory Cell Based on Micro-Electro-Mechanics," IEEE pp. 172-176, 1990.
Honeywell Inc., "Hall Effect Sensing and Application," 126 pages, prior to Dec. 15, 2011.
Honeywell, "RM7800L1087; RM7840G1022,L1075,L1091; EC7840L1014 Relay Modules with Valve Proving," Installation Instructions, 32 pages, 2009.
Korte et al., "Smart Valve Positioners and Their Use in Safety Instrumented Systems," Industrial Valves, pp. 41-47, 2009.
Kromschroder, "Governor with Solenoid Valve VAD Air/Gas Ratio Control with Solenoid Valve VAG," 24 pages, prior to Dec. 15, 2011.
Kromschroder, "Governor with Solenoid Valve VAD Air/Gas Ratio Control with Solenoid Valve VAG," 8 pages, prior to Dec. 15, 2011.
Kromschroder, "Solenoid Valves for Gas VAS," 28, pages, prior to Dec. 15, 2011.
Kromschroder, "Solenoid Valves for Gas VAS," 8 pages, prior to Dec. 15, 2011.
Kromschroder, "Tightness Control TC," 8 pages, 2011.
Minami et al., "Fabrication of Distributed Electrostatic Micro Actuator (DEMA)," IEEE Journal of Microelectromechanical Systems, vol. 2, No. 3, pp. 121-127, Sep. 1993.
Ohnstein et al., "Micromachined Silicon Microvalve," IEEE, pp. 95-98, 1990.
Porex Technologies, brochure, 4 pages, prior to Dec. 29, 2004.
Shikida el al., "Characteristics of an Electrostatically-Driven Gas Valve Under High Pressure Conditions," IEEE, pp. 235-240, 1994.
Shikida et al., "Electrostatically Driven Gas Valve With High Conductance," IEEE Journal of Microelectromechanical Systems, vol. 3, No. 2, pp. 76-80, Jun. 1994.
Shikida et al., "Fabrication of an S-Shaped Microactuator," IEEE Journal of Microelectromechanical Systems, vol. 6, No. 1, pp. 18-24, Mar. 1997.
Siemens Building Technologies, "Double Gas Valves VGD20 . . . , VGD40 . . . ," 12 pages, Aug. 5, 2002.
Siemens Building Technologies, Inc., "Siemens Technical Instructions Document No. 155-512P25VG . . . ," 12 pages, Aug. 11, 2005.
Siemens Building Technologies, Inc., "SKP . . . 15U . . . Gas Valve Actuator with Safety Shutoff Function," Document No. 155-751 SKP15 . . . U . . . , 5 pages, Jul. 1, 2005.
Siemens Building Technologies, Inc., "SKP25 . . . U . . . Air/Gas Ratio Controlling Gas Valve Actuator with Safety Shutoff Function," Technical Instructions Document No. 155-754, SKP25 . . . U, 9 pages, Jul. 1, 2005.
Siemens Building Technologies, Inc., "SKP25 . . . U . . . Pressure Regulating Gas Valve Actuator with Safety Shut-Off Function," Technical Instructions Document No. 155-752, SKP25 . . . U, 7 pages, Jul. 1, 2005.
Srinivasan et al., "Setf-Assembled Fluorocarbon Films for Enhanced Stiction Reduction", IEEE Transducers, 1997 International Conference on Solid-State Sensors and Actuators, Chicago, pp. 1399-1402, Jun. 16-19, 1997.
Universal Metering, "SmartValve Wireless Shut-Off Valve," Universal Metering Ltd., 4 pages, prior to Mar. 12, 2013.
Wagner et al., "Bistable Microvalve with Pneumatically Coupled Membranes," IEEE, pp. 384-388, 1996.
Wilkerson, "Understanding Valve Actuatior Diagnostics," Control Engineering, vol. 56, No. 11, 4 pages, Nov. 2009.
www.combustion911.com/products/valve-proving-controls-tc-410.html, "Kromschroeder Valve Proving Controls TC410," 7 pages, prior to Dec. 15, 2011, printed May 23, 2012.
Yang et al., "Fluorescent Porous Polymer Films as TNT Chemosensors: Electronic and Structural Effects", J. Am. Chem. Soc., pp. 11864-11873, 1998.
Yang et al., "Porous Shape Persistent Fluorescent Polymer Films: An Approach to TNT Sensory Materials", J. Am. Chem. Soc., pp. 5321-5322, 1998.
Allianz Risk Consulting, "Safety Shutoff Valves for Fuel-Fired Heating Equipment," Tech Talk, vol. 1, 3 pages, Oct. 2012.
Communication of a Notice of Opposition for EP Application Serial No. EP12196398.7, dated Feb. 15, 2016.
Honeywell, "V4730C/V8730C/V4734C 1:1 Gas/Air Servo Regulated Gas Valves, Product Data," 16 pages, 2006.
Honeywell, "V4943A/V8943A On/Off Diaphragm Gas Valves, Product Data," 8 pages, Apr. 2009.
Honeywell, "V5055A-F Industrial Gas Valves, Product Data," 12 pages, Nov. 2012.
https://en.wikipedia.org/wiki/SCADA, "SCADA," 10 pages, printed Mar. 29, 2016.
Maxon Corporation, "Functional Testing of Maxon Shut-off Valves, Valve Technical Data," 3 pages, 2008.
Response to Opposition for EP Application Serial No. EP12196398.7, filed Jul. 15, 2016.

\* cited by examiner

HUMAN-MACHINE INTERFACE FOR GAS VALVE

TECHNICAL FIELD

The disclosure relates generally to valves, and more particularly, to gas valve assemblies and mechanisms for interfacing with gas valve assemblies.

BACKGROUND

Valves are commonly used in conjunction with many appliances for regulating the flow of fluid. For example, gas valves are often incorporated into gas-fired appliances to regulate the flow of gas to a combustion chamber or burner. Examples of such gas-fired appliances may include, but are not limited to, water heaters, furnaces, boilers, fireplace inserts, stoves, ovens, dryers, grills, deep fryers, or any other such device where gas control is desired. In such gas-fired appliances, the gas may be ignited by a pilot flame, electronic ignition source, or other ignition source, causing combustion of the gas at the burner element producing heat for the appliance. In many cases, in response to a control signal from a control device such as a thermostat or other controller, the gas valve may be moved between a closed position, which prevents gas flow, and an open position, which allows gas flow. In some instances, the gas valve may be a modulating gas valve, which allows gas to flow at one or more intermediate flow rates between the fully open position and the fully closed position.

SUMMARY

This disclosure relates generally to valves, and more particularly, to gas valve assemblies and mechanisms for interfacing with gas valve assemblies. In one illustrative but non-limiting example, a valve leakage test may be performed on a valve assembly including a valve body having an inlet port and an outlet port with a fluid path extending between the inlet port and the outlet port. Between the inlet port and the outlet port, the valve assembly may include a first gas valve and a second gas valve positioned downstream of the first gas valve, with an intermediate volume between the first gas valve and the second gas valve defined by the valve body. The first and second gas valves may be selectively movable between a closed position, which may close the fluid path, and an open position, by respective valve actuators. One or more pressure sensors may be in fluid communication with the intermediate volume for sensing a measure that is related to a pressure change rate in the intermediate volume. In some instances, the pressure sensor may be in communication with a valve controller having memory or in communication with other memory storing one or more threshold values. The valve controller may be configured to open the first valve and the second valve to allow gas to flow from the gas inlet to the gas outlet and close one or more of the first valve and the second valve to prevent gas flow from the gas inlet to the gas outlet. In some cases, a human machine interface (HMI) may be operatively coupled to the valve controller. The HMI may include a user interface with a display, where the user interface may include a start button that when selected may initiate the valve leakage test.

In some instances, an HMI may facilitate interacting with a valve assembly to initiate and/or monitor a valve test on the valve assembly. The HMI may include an interface for sending and/or receiving information, memory, a user interface including a display, and an HMI controller. The HMI controller may be operatively coupled with the interface, the memory, and the user interface. In some cases, the HMI controller may receive an initiation of a test for the valve assembly via the user interface and send a signal to the valve assembly over the interface. The sent signal may initiate the valve test on the valve assembly.

In operation, the HMI may be configured to initiate a valve leakage test on a gas assembly coupled to a non-switched or other gas source that is under a positive pressure during the valve leakage test. In a method of operation, a user may initiate a valve leakage test of the gas valve assembly by selecting a start button on a user interface of an HMI. The HMI may be configured to display received results of the valve leakage test on a display of the HMI in real time during the valve leakage test.

The preceding summary is provided to facilitate an understanding of some of the innovative features unique to the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various illustrative embodiments in connection with the accompanying drawings, in which.

Figure 1:
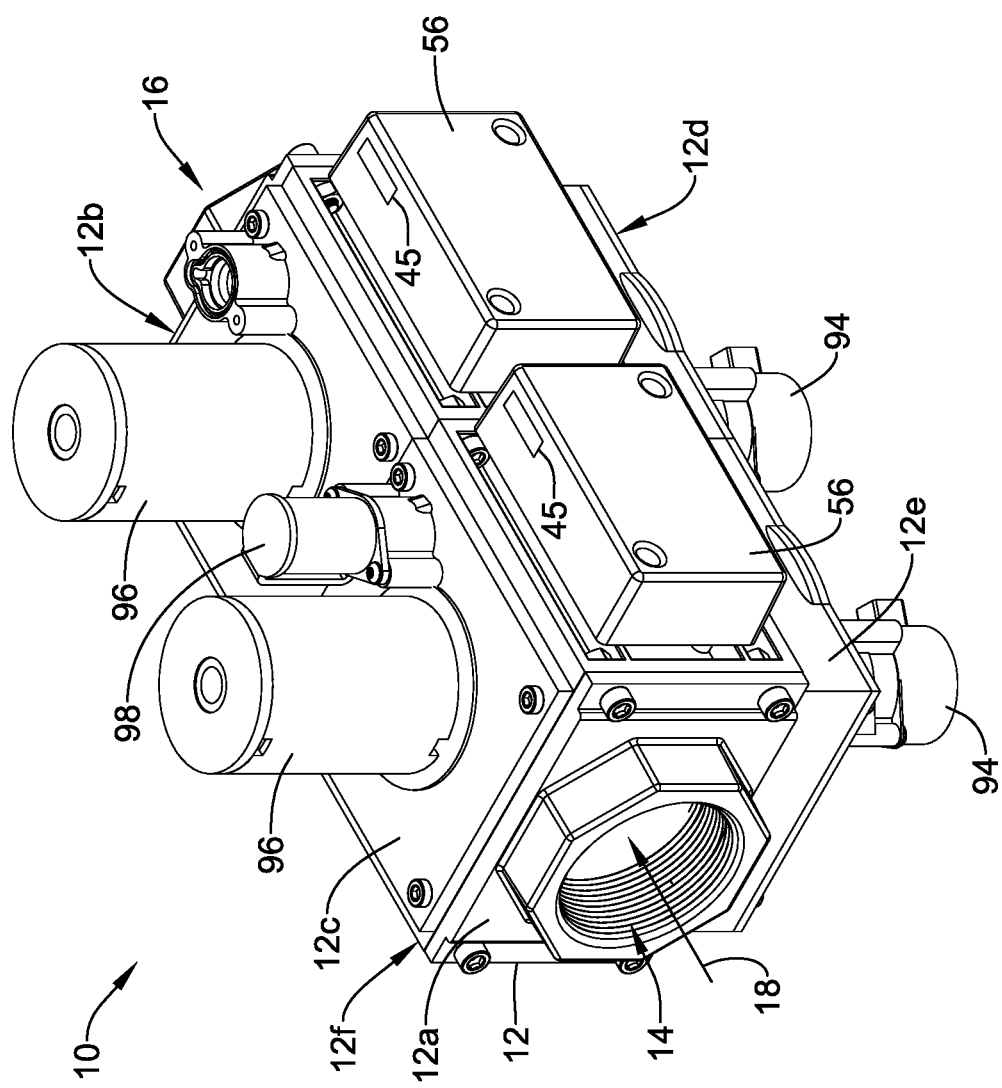
FIG. 1 is a schematic perspective view of an illustrative fluid valve assembly.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The detailed description and drawings show several illustrative embodiments which are meant to be illustrative of the claimed disclosure.

Gas valves may be used with fluid path systems supplying fuel and/or fluid to appliances (e.g., burners, etc.) or may be used individually or in different systems. In some instances, gas safety shutoff valves may be utilized as automatic redundant valves. Redundancy is achieved, and often times required by regulatory agencies, by placing at least two safety shutoff valves in series. The aforementioned redundant valves may be separate valves fitted together in the field and/or valves located together in a single valve body. These redundant valves are commonly referred to as double-block valves. In accordance with this disclosure, these and other gas valves may be fitted to include sensors and/or switches and/or other mechanical or electronic devices to assist in monitoring and/or analyzing the operation of the gas valve and/or connected appliance. The sensors and/or switches may be of the electromechanical type, the electronic type, or of other types of sensors and/or switches, as desired.

In some cases, a gas valve assembly may be configured to monitor and/or control various operations including, but not limited to, monitoring fluid flow and/or fluid consumption, electronic cycle counting, overpressure diagnostics, high gas pressure and low gas pressure detection, valve proving system tests, valve leakage tests, proof of valve closure tests, diagnostic communications, and/or any other suitable operation as desired. Examples of gas valve assemblies used for monitoring and/or controlling such operations are disclosed in U.S. application Ser. No. 13/326,358, now U.S. Pat. No. 8,947,242, filed on Dec. 15, 2011, and entitled GAS VALVE WITH LEAKAGE TEST, which is hereby incorporated by reference in its entirety for all purposes.

Valve Assembly

FIG. 1 is a schematic perspective view of an illustrative fluid (e.g., gas, liquid, etc.) valve assembly 10 for controlling fluid flow to a combustion appliance or other similar or different device. In the illustrative embodiment, the gas valve assembly 10 may include a valve body 12, which may generally be a six sided shape or may take on any other shape as desired, and may be formed as a single body or may be multiple pieces connected together. As shown, valve body 12 may be a six-sided shape having a first end 12a, a second end 12b, a top 12c, a bottom 12d, a back 12e and a front 12f, as depicted in FIG. 1. The terms top, bottom, back, front, left, and right are relative terms used merely to aid in discussing the drawings, and are not meant to be limiting in any manner.

Figure 2:
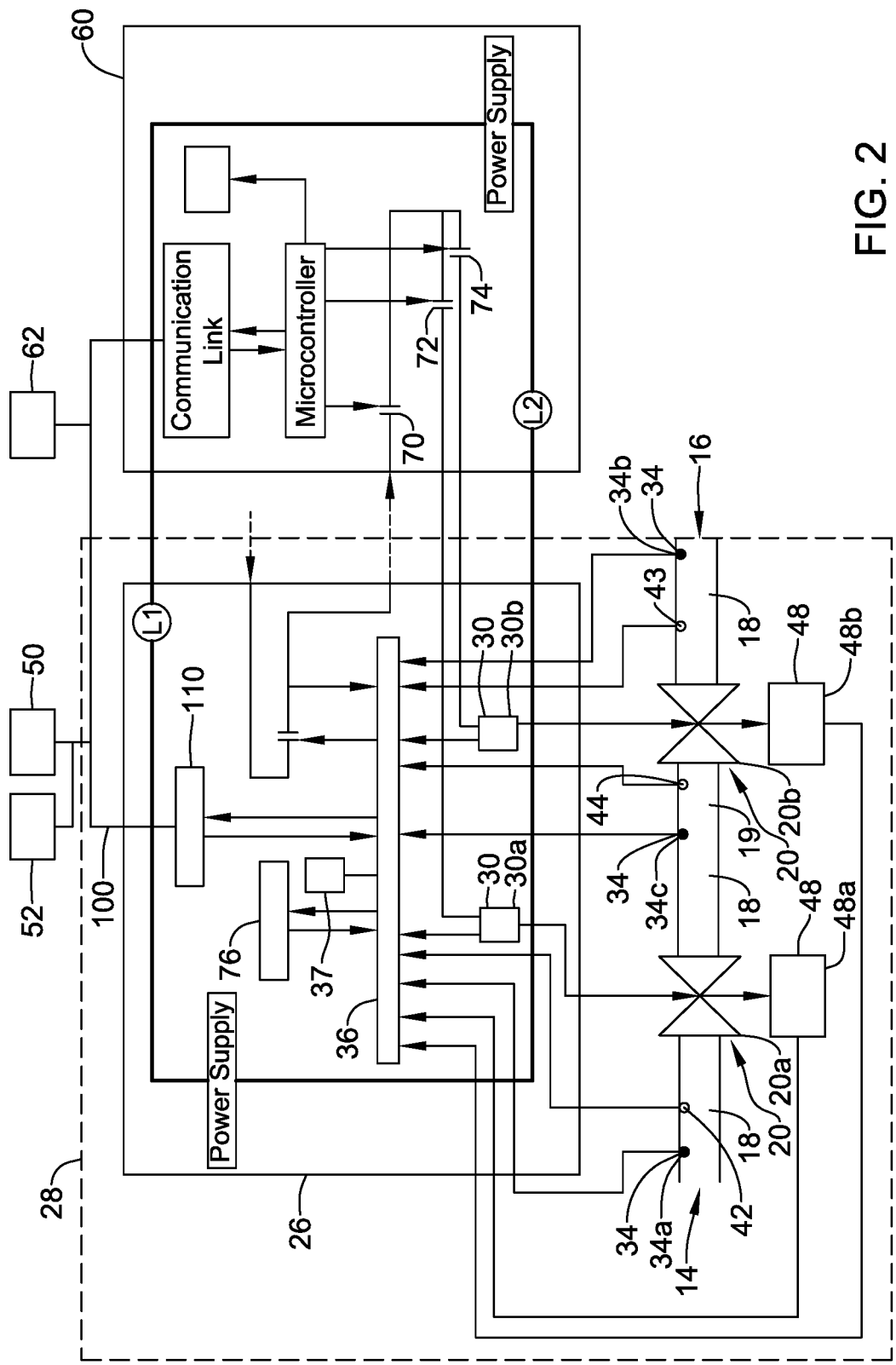
FIG. 2 is a schematic diagram showing an illustrative fluid valve assembly in communication with a remote control system and an appliance control system, where the fluid valve assembly includes multiple sensors connected to a valve controller.

The illustrative valve body 12 may include an inlet port 14, an outlet port 16, and a fluid path or fluid channel 18 extending between inlet port 14 and outlet port 16. Further, valve body 12 may include one or more gas valve ports 20 (e.g., a first valve port 20a and a second valve port 20b, shown in FIG. 2) positioned or situated in fluid channel 18, one or more fuel or gas valve member(s) sometimes referred to as valve sealing member(s) moveable within gas valve ports 20 (e.g., a first valve sealing member within first valve port 20a and a second valve sealing member within second valve port 20b), one or more pressure sensor assemblies 42, 43, 44 (as shown in FIG. 2, for example), one or more position sensors 48, and/or one or more valve controllers 26 (as shown in FIG. 2, for example) affixed relative to or coupled to valve body 12 and/or in electrical communication (e.g., through a wired or wireless connection) with pressure sensor assemblies 42, 43, 44, and position sensor(s) 48.

The valve assembly 10 may further include one or more actuators for operating moving parts therein. For example, the valve assembly 10 may have actuators including, but not limited to, one or more stepper motors 94 (shown as extending downward from the bottom 12d of the valve body 12 in FIG. 1), one or more solenoids 96 (shown as extending upward from top 12c of valve body 12 in FIG. 1), and one or more servo valves 98 (a servo valve 98 is shown as extending upward from the top 12c of the valve body 12 in FIG. 1-3, where a second servo valve has been omitted), where the servo valve 98 may be a 3-way auto-servo valve or may be any other type of servo valve. In one illustrative embodiment, the one or more solenoids 96 may control whether the one or more gas valve ports 20 are open or closed. The one or more stepper motors 94 may determine the opening size of the gas valve ports 20 when the corresponding gas valve sealing member is opened by the corresponding solenoid 96. Of course, the one or more stepper motors 94 would not be provided when, for example, the valve assembly 10 is not a "modulating" valve that allows more than one selectable flow rate to flow through the valve when the valve is open.

As shown, valve body 12 may include one or more sensor and electronics compartments 56, which in the illustrative embodiment, may extend from the back side 12e as depicted in FIG. 1. The sensor and electronics compartments 56 may be coupled to or may be formed integrally with the valve body 12, and may enclose and/or contain at least a portion of the valve controllers 26, the pressure sensors assemblies 42, 43, 44, the one or more electronic connection port 45 (e.g., USB, HDMI, and/or other data ports or other ports) and/or the electronics required for operation of valve assembly 10 as described herein. Although the compartments 56 may be illustratively depicted as separate structures, the compartments 56 may be a single structure part of, extending from, and/or coupled to the valve body 12.

In the illustrative embodiment, the one or more fluid valve ports 20 may include the first gas valve port 20a and the second gas valve port 20b situated along and/or in communication with the fluid channel 18. This is a double-block valve design. Within each gas valve port 20, a gas valve sealing member may be situated in fluid channel 18 and may be positioned (e.g., concentrically or otherwise) about an axis, rotatable about the axis, longitudinally and axially translatable, rotationally translatable, and/or otherwise selectively movable between a first position (e.g., an open or closed position) and a second position (e.g., a closed or open position) within the corresponding valve port 20. Movement of the valve sealing member may open and close the valve port 20.

The valve actuator(s) 30 may be any type of actuator configured to operate valve sealing member by actuating valve sealing member from the closed position to an open position and then back to the closed position during each of a plurality of operation cycles during a lifetime of the gas valve assembly 10 and/or of actuator 30. In some cases, valve actuator 30 (e.g., a first valve actuator 30a and a second valve actuator 30b, as seen in FIG. 2) may be a solenoid actuator, a hydraulic actuator, magnetic actuators, electric motors, pneumatic actuators, and/or other similar or different types of actuators, as desired. In the example shown, the valve actuators 30a, 30b may be configured to selectively move valves or valve sealing members of the valve ports 20a, 20b between a closed position, which closes the fluid channel 18 between the inlet port 14 and the outlet port 16 of the valve body 12, and an open position. The gas valve assembly 10 of FIGS. 1 and 2 is an example of a gas safety shutoff valve, or double-block valve. In some cases, however, it is contemplated that the gas valve assembly 10 may have a single valve sealing member or three or more valve sealing members in series or parallel, as desired.

In some cases, valve assembly 10 may include a characterized port defined between the inlet port 14 and the outlet port 16. A characterized port may be any port (e.g., a fluid valve port 20 or other port or restriction through which fluid channel 18 may travel) at or across which an analysis may be performed on a fluid flowing therethrough. For example, if a flow resistance of a valve port 20 is known over a range of travel of the valve sealing member, the one of the one or more gas valve ports 20 may be considered the characterized port. As such, and in some cases, the characterized port may be a port 20 having valve sealing member configured to be in an open position and in a closed position. Alternatively, or in addition, a characterized port may not correspond to a gas valve port 20 having valve sealing member. Rather, the characterized port may be any constriction or feature across which a pressure drop may be measured and/or a flow rate may be determined.

In some cases, the characterized port may be characterized at various flow rates to identify a relationship between a pressure drop across the characterized port and the flow rate through the fluid channel 18. In some cases, the pressure drop may be measured directly with one or more pressure sensors (e.g., pressure sensors 42, 43, and/or 44). In other cases, the pressure drop may be inferred from, for example, the current position of the valve member(s). These are just some examples. In some cases, the relationship may be stored in a memory, such as a RAM, ROM, EEPROM, other volatile or non-volatile memory, or any other suitable memory of the gas valve assembly 10, but this is not required.

In some cases, the gas valve assembly 10 may include a flow module 28 for sensing one or more parameters of a fluid flowing through fluid channel 18, and in some cases, determining a measure related to a gas flow rate of the fluid through the fluid channel 18. In some instances, the flow module may include a pressure block or pressure sensor assembly (e.g., in some cases, the pressure sensors 42, 43, 48), a temperature sensor 34 (e.g., in some cases, temperature sensors 34a, 34b, and/or 34c), a valve member position sensor 48 (e.g., in some cases, position sensors 48a, 48b), and/or a valve controller 26, among other assemblies, sensors and systems for sensing, monitoring and/or analyzing parameters of a fluid flowing through the fluid channel 18, such as can be seen in FIG. 2.

It is contemplated that a flow module 28 may utilize any type of sensor to facilitate determining a measure related to a flow rate of a fluid through the fluid channel 18, such as a pressure sensor, a flow sensor, a valve position sensor, and/or any other type of sensor, as desired. In one example, the flow module 28 may be configured to monitor a differential pressure across one or more characterized port, and in some cases, a position of one or more valve sealing members of the gas valve assembly 10. The information from monitoring may be utilized by the flow module 28 to determine and/or monitor the flow rate of fluid (liquid or gas) passing through the fluid channel 18. For example, the flow module 28 may determine a measure that is related to a gas flow rate through the fluid channel 18 based, at least in part, on the measure that is related to the pressure drop across the characterized port along with the pre-stored relationship in the memory. In some cases, the current position of one or more valve sealing members of the gas valve assembly 10 may also be taken into account (e.g. is the valve 30% open, 50% open or 75% open).

In some instances, the flow module 28 may be configured to output the flow rate of fluid passing through the fluid channel 18 to a display and/or a remote device. In some cases, the flow module may maintain a cumulative gas flow amount passing through the fluid channel 18 (e.g. over a time period), if desired. The measure related to a gas flow may include, but is not limited to, a measure of fuel consumption by a device or appliance that is connected to an output port 16 of the gas valve assembly 10.

It is contemplated that the electronic valve controller or valve control block 26 (see, FIG. 2) may be physically secured or coupled to, or secured or coupled relative to, the valve body 12 (e.g., in some cases, within one or more of the sensor and electronics compartments 56). The valve controller 26 may be configured to control and/or monitor a position or state (e.g., an open position and a closed position) of valve sealing members of valve ports 20 and/or to perform other functions and analyses, as desired. In some cases, valve control block 26 may be configured to close or open gas valve member(s) or valve sealing member(s) on its own volition, in response to control signals from other systems (e.g., a system level or central building control), and/or in response to received measures related to sensed pressures upstream, intermediate, and/or downstream of the characterized valve port(s), measures related to a sensed differential pressure across the characterized valve port(s), measures related to temperature sensed upstream, intermediate, and/or downstream of the characterized valve port(s), and/or in response to other measures, as desired.

The memory, which in some cases may be part of the valve controller 26, may be configured to record data related to sensed pressures, sensed differential pressures, sensed temperatures, and/or other measures. The valve controller 26 may access this data, and in some cases, communicate (e.g., through a wired or wireless communication link 100) the data and/or analyses of the data to other systems (e.g., a system level or central building control). The memory may be programmed and/or developed to contain software to effect one or more of the configurations described herein.

In some instances, the valve controller 26 may be considered a portion of flow module 28, the flow module 28 may be considered part of the valve controller 26, or the flow module 28 and the valve controller 26 may be considered separate systems or devices. In some instances, the valve controller 26 may be coupled relative to the valve body 12 and one or more gas valve ports 20, where the valve controller 26 may be configured to control a position (e.g., open or closed positions, including various open positions) of valve sealing member within the valve port 20. In some cases, the valve controller 26 may be coupled to pressure sensor assembly 42, 43, 44, temperature sensor 34, position sensor 48, and/or other sensors and assemblies, as desired.

In the illustrative embodiment of FIG. 2, the valve controller 26 may be configured to monitor a differential pressure across a characterized port. In some instances, the valve controller 26 may monitor a differential pressure across the fluid valve port 20 and/or monitor a measure related to a pressure upstream of a fluid valve port 20 (e.g., the first valve port 20a) and/or a measure related to a pressure downstream of a fluid valve port 20 (e.g., the second valve port 20b). The valve controller 26 may also be configured to monitor an axial position of the valve sealing member in the valve port 20. As a result, the valve controller 26 may determine a flow rate of fluid passing through the characterized port, where the valve controller 26 may determine the flow rate (and sometimes fluid consumption) based, at least in part, on the monitored differential pressure and/or monitored upstream and downstream pressures in conjunction with a pre-characterized relationship between the pressure drop across the characterized port and the flow rate. In some cases, the monitored axial positioning of the valve sealing member may also be taken into account, particularly when the valve sealing member may assume one or more intermediate open positions between the fully closed and fully opened positions. When so provided, the pre-characterized relationship between the pressure drop across the characterized port and the flow rate may depend on the current axial positioning of valve sealing member.

In some instances, the valve controller 26 may include a determining block, which may include the microcontroller 36 or the like, which may include or be in communication with a memory 37, such as a non-volatile memory. Alternatively, or in addition, the determining block (e.g. microcontroller 36) may be coupled to or may be configured within valve control block or valve controller 26. The determining block may be configured to store and/or monitor one or more parameters, which may be used when determining a measure that is related to a fluid flow rate through fluid channel 18. The determining block (e.g. microcontroller 36) may be configured to use the stored and/or monitored parameters (e.g. the relationship between a pressure drop across a characterized port and the flow rate through the fluid channel 18) stored in the memory to help determine a measure that is related to a fluid flow rate through the fluid path or fluid channel 18.

Illustratively, the determining block (e.g. microcontroller 36) may be configured to determine and/or monitor a measure (e.g., a flow rate of fluid passing through the characterized port or other similar or different measure, as desired) based, at least in part, on stored and/or monitored measures including, but not limited to, measures related to pressure drop across a characterized valve port or other pressure related measures upstream and downstream of the characterized valve port, a temperature of the fluid flowing through fluid channel 18, and/or a measure related to a current position of valve sealing member at the valve port 20 or the size of an opening at the characterized port. In one example, a determining block (e.g. microcontroller 36) may include non-volatile memory that is configured to store opening curves of the valve assembly 10, where the opening curves may characterize, at least in part, a flow rate as a function of a sensed axial position of valve sealing member, and a sensed differential pressure across a characterized valve port 20 or an otherwise determined pressure at or adjacent a characterized valve port 20 (e.g., knowing a set-point of an upstream pneumatic pressure reducing valve (PRV), as the set-point pressure of the PRV may be substantially equal to the pressure at an inlet of the characterized valve port), and may facilitate determining an instantaneous and/or cumulative fluid (e.g., fuel) flow in fluid channel 18 and/or consumption by an appliance in fluid communication with valve assembly 10.

It is contemplated that the determining block (e.g. microcontroller 36) may continuously or non-continuously control, store, and/or monitor a position (e.g., an axial or rotary position or open/closed state or other position) of the valve sealing member within the valve port 20, monitor a differential pressure across the characterized port, and/or monitor a temperature upstream and/or downstream of the characterized port. In addition, the microcontroller 36 may continuously or non-continuously determine the flow rate of the fluid passing through the characterized port, where the microcontroller 36 may be configured to record in its memory or in another location, an instantaneous flow rate of fluid flowing through the characterized port, a cumulative flow volume, and/or a determined instantaneous or cumulative (e.g., total) fluid consumption based on the positions of valve sealing member(s) and determined flow rates at an instant of time or over a specified or desired time period. In addition or alternatively, the determining block (e.g. microcontroller 36) may be configured to report out the instantaneous flow rate, cumulative flow volume and/or total or cumulative fluid consumption over a given time period. The determining block (e.g. microcontroller 36) may report the instantaneous flow rate, cumulative flow rate, and/or total or cumulative consumption of the fluid flowing through the characterized port to the system display 52 of a remote overall system controller 50 (e.g., a building/industrial automation system (BAS/IAS) controller), an appliance display 62 of an appliance controller 60 where the appliance may be configured to receive the flowing fluid, a display adjacent the gas valve assembly 10, or any other display, device, controller and/or memory, as desired.

In some instances, the valve controller 26 may include or be in communication with a valve actuator 30, which in conjunction with the stepper motor 94 or other device is configured to position the valve sealing member in the valve port 20. The valve actuator 30 and/or stepper motor 94 may be in communication with the microcontroller 36 of the valve controller 26, and the microcontroller 36 may be configured to control, monitor, and/or record the position (e.g., axial position, radial position, etc.) of the valve sealing member within the valve port 20 through the valve actuator 30 (e.g., valve actuator 30 may be configured to effect the locking (e.g., valve actuator 30 OFF) or the unlocking (e.g., valve actuator 30 ON) of the valve sealing member in a particular position) and the stepper motor 94 (e.g., the stepper motor 94 may be configured to adjust the position of valve sealing member when it is not locked in a particular position), or through only the stepper motor 94. Alternatively, or in addition, the microcontroller 36 may be configured to monitor and record the position of valve sealing member within the valve port 20 through a connection with a position sensor 48 or through other means.

The microcontroller 36 may continuously or non-continuously monitor and record the position (e.g., axial position, radial position, etc.) of the valve sealing member within valve port 20 through the valve actuator 30 and the stepper motor 94, and the microcontroller 36 may indicate the sensed and/or monitored position of valve sealing member within the valve port 20 as a prescribed position of the valve sealing member. The prescribed position of valve sealing member may be the position at which the valve sealing member was and/or is to be located, whereas a position of the valve sealing member sensed by the position sensor system 48 may be considered an actual position of the valve sealing member within the valve port 20.

In some instances, the valve controller 26 may be configured to perform electronic operational cycle counting or may include an electronic counter configured to count each operational valve cycle of valve sealing members during, for example, the lifetime of gas valve assembly 10 or during some other time period. In some cases, the microprocessor 36 of the valve controller 26 may be configured to monitor a total number of operational cycles (e.g., the number of times fuel valve sealing members are operated from a closed position to an open position and back to a closed position) of the valve ports 20 and measures related thereto. In some cases, the microprocessor 36 may store such data in a non-volatile memory, such as the memory 37, sometimes in a tamper proof manner, for record keeping and/or other purposes. The microprocessor 36 may monitor the number of cycles of valve sealing members in one or more of several different manners. For example, microprocessor 36 may monitor the number of cycles of the valve sealing members by monitoring the number of times first main valve switch 72 and/or second main valve switch 74 are powered or, where one or more control signals may be provided to fuel valve actuator(s) 30 controlling when the fuel valve actuator(s) 30 selectively moves (e.g., opens or closes) valve sealing member(s), the microprocessor 36 may monitor the one or more control signals.

The valve controller 26, in some cases, may monitor the main valve switches 72, 74 by receiving signals directly from a device located remotely from the valve assembly 10 on which the main valve switches 72, 74 may be located. Switches ((main valve switches 72, 74 and safety switch 70 (discussed below)) may be any mechanism capable of performing a switching function including, but not limited to, relays, transistors and/or other solid state switches and circuit devices and/or other switches. The valve controller 26 may include an electrical port, sometimes separate from a communications interface 110 (discussed below), for receiving one or more control signals from the device located remotely from valve assembly 10. The one or more control signals received via the electrical port may include, but are not limited to: a first valve port 20*a* control signal that, at least in part, may control the position of first valve sealing member via first valve actuator 30*a*, and a second valve port 20*b* control signal that, at least in part, may control the position of the second valve sealing member via second valve actuator 30*b*.

As an alternative to monitoring control signals, or in addition, microprocessor 36 may monitor the number of cycles of valve sealing members by monitoring data from a position sensor 48. For example, the microprocessor 36 of the valve controller 26 may monitor the position sensor 48 and record the number of times the valve sealing members are in an open position after being in a closed position and/or the number of times valve sealing members are in a closed position after being in an open position and/or the number of times the valve sealing members are operated from a close position to an open position and back to a closed position. These are just some examples. Further, if the valve controller 26 is operating valve sealing members, the valve controller 26 may monitor the number of operational cycles by counting its own control signals sent to the valve actuators 30 and/or the stepper motors 94.

The non-volatile memory, which may maintain and/or store the number of operational valve cycles, may be positioned directly on, or packaged with, the valve body 12 (e.g., on or within memory of microcontroller 36) and/or may be accessible by valve controller 26. Such storage, placement and/or packaging of valve cycle data may allow for replacement of components in the overall system (e.g., an appliance control 60, etc.) without losing the valve cycle data. In an illustrative instance, valve cycle data may be securely stored, such that it may not be tampered with. For example, the valve cycle data may be stored the non-volatile memory of the valve controller 26 and the valve cycle data may be password protected.

The valve controller 26 may include an I/O or communications interface 110 with a communication protocol for transmitting data to and/or otherwise communicating with one or more remote device(s) that may be located remotely from the valve assembly 10 (e.g., a combustion appliance including the controller 60 located remotely from valve assembly 10, a remote human-machine interface, such as a remote diagnostics system, etc.) and/or located adjacent the device (e.g., a local human-machine interface, such as, a local diagnostics system, an installation tool, and/or maintenance tool). Communications interface 110 may be a wired or wireless communication interface, where the wired or wireless communication interface 110 may be configured to be compatible with a predetermined communication bus protocol or other communication protocol. A wired link may be low voltage (e.g. 24V, 5V, 3V, etc.), which may reduce certain issues related to line-voltage wiring schemes. Illustratively, communications interface 110, using the predetermined communication bus protocol or other communication protocol, may be configured to output and/or communicate one or more valve conditions, one or more measures related to valve conditions, one or more conditions related to a fluid flow through fluid channel 18, and/or one or more diagnostic parameters, conditions or events, to a device located adjacent or remote from valve assembly 10. In some cases, the communications interface 110 may include or may be in communication with electronic data port(s) 45.

As discussed, the valve controller 26 may be configured to determine one or more valve conditions based on one or more diagnostic parameters related to fluid channel 18 sensed by one or more sensor(s) (e.g., a pressure sensor, etc.) in communication with the fluid channel 18. The diagnostic parameters may be determined by the valve controller 26 and stored in a non-volatile memory or other memory accessible by the valve controller 26. The diagnostic parameters may include, but are not limited to, a total number of operational cycles, a fuel usage parameter, one or more fault history parameters, one or more user or factory or other setting parameters, self diagnostic check parameters, fault parameters and/or other similar or dissimilar parameters, as desired. The communicated valve condition(s) or measure(s) related to the valve condition(s) may be determined by the valve controller 26 or one or more remote devices. Illustrative valve conditions and measures related to valve conditions may include, but are not limited to: high fuel pressure conditions, low fuel pressure conditions, valve closure conditions, valve leak conditions, safety event condition, and/or other similar or dissimilar valve conditions and/or outputs.

In addition to the communication interface 110 being configured to output information to a device located adjacent or remote from the valve assembly 10, the communication interface 110 may be configured to receive one or more inputs from the remote device or an adjacently positioned device. Illustrative inputs may include, but are not limited to: an acknowledgement of reception of one or more of the valve conditions, a user setting, a system setting, a valve command, and/or other similar or dissimilar input.

In some instances, the valve controller 26 may communicate through the I/O interface or communication interface 110 with a remotely located output block, where the output block may display and/or output a determined measure related to fluid flow rate through the fluid channel 18, sometimes along with other data, information and controls sent from the valve controller 26. The output block may include a display and/or other remote systems, and the microcontroller 36 may be configured to send measures to a device control system 60 or building automation system or overall system controller 50 of the output block for further monitoring and/or analysis. As discussed, the I/O interface may include a wired and/or wireless interface between valve controller 26 (e.g., microcontroller 36) and the output block systems (e.g., building automation system or overall system controller 50, combustion appliance controller 60, handheld device, laptop computer, smart phone, etc.), where the connection between the valve controller 26 may or may not be made with the communication link 100 (e.g., communication link 100 could, but need not be, the one and only one communication link).

A pressure block including the pressure sensor assembly 42, 43, 44 may be included in the flow module and/or the pressure sensor assembly 42, 43, 44 may be at least partially separate from the flow module 28. The pressure sensor assembly 42, 43, 44 may be configured to continuously or non-continuously sense pressure or a measure related to pressure upstream and/or downstream of a characterized port and/or along other portions of the fluid channel 18. Although the pressure sensor assembly 42, 43, 44 may additionally, or alternatively, include a mass or volume flow meter to measure a flow of fluid through the fluid channel 18, it has been contemplated that such meters may be more expensive and difficult to place within or outside the valve assembly 10; thus, a useful, relatively low cost alternative and/or additional solution may include placing the pressure sensors 42, 43, 44 and/or other pressure sensors within, about and/or integrated in the valve body 12 of valve assembly 10 to measure the fluid flow through the fluid channel 18, the pressures at the input and output ports, and/or other similar or different pressure related measures. The pressure sensors 42, 43, 44 may include any type of pressure sensor element. For example, the pressure sensor element(s) may be MEMS (Micro Electro Mechanical Systems) pressure sensors elements or other similar or different pressure sensor elements such as an absolute pressure sense element, a gauge pressure sense element, or other pressure sense element as desired. Example sense elements may include, but are not limited to, those described in U.S. Pat. Nos. 7,503,221; 7,493,822; 7,216,547; 7,082,835; 6,923,069; 6,877,380, and U.S. patent application publications: 2010/0180688; 2010/0064818; 2010/00184324; 2007/0095144; and 2003/0167851, all of which are hereby incorporated by reference.

In some cases, the pressure sensor assembly 42, 43, 44 may include a differential pressure sensor for measuring a differential pressure drop across a characterized valve port 20, or across a different characterized port. A pressure sensor assembly 42, 43, 44 including a differential pressure sensor may be exposed to both a first pressure upstream of a characterized valve port and a second pressure downstream of the characterized valve port. A differential pressure sensor may send a measure related to the sensed differential pressure to the microcontroller 36 of the valve controller 26. The microcontroller 36 may be configured to monitor the differential pressure across the characterized port with the differential pressure measures sensed by the differential pressure sensor.

Alternatively, or in addition, the illustrative pressure sensors 42, 43, 44 may include one or more first pressure sensors 42 upstream of a characterized valve port and one or more second pressure sensors 43 downstream of the characterized valve port, where the first and second pressure sensors 42, 43 may be in fluid communication with the fluid channel 18 and may be configured to sense one or more measures related to a pressure upstream and a pressure downstream, respectively, of the characterized valve port, as seen in FIG. 2. Where a second valve port (e.g., second valve port 20b) may be positioned downstream of a first characterized valve port (e.g. first valve port 20a) and forming an intermediate volume 19 between the first and second valve ports 20a, 20b, a third pressure sensors 44 in fluid communication with the intermediate volume 19 may sense one or more measures related to a pressure in the intermediate volume 19. Where two characterized ports are utilized, the first pressure sensors 42 may be upstream of both characterized ports, the second pressure sensors 43 may be downstream of both characterized ports, and the third pressure sensors 44 may be downstream from the first characterized port and upstream from the second characterized, but this is not required (e.g., the first and second pressure sensors 42, 43 may be used to estimate the pressure drop across the valves). Additionally, or in the alternative, one or more pressure sensors 42, 43, 44 may be differential pressure sensors utilized to estimate the pressure drop across the first characterized port and/or the second characterized port. It is further contemplated that valve ports 20 may not be characterized ports.

The pressure sensors 42, 43, 44 may be configured to send each of the sensed measure(s) directly to the microcontroller 36. The microcontroller 36 may be configured to save the sensed measures and/or related information to the memory 37 (e.g., non-volatile memory or other memory), and may perform one or more analyses on the received sensed measures. For example, the microcontroller 36 may determine a measure that is related to a fluid flow rate through the fluid path, pressure drops across valve ports, and/or other analyses based, at least in part, on the received sensed measures related to pressure upstream of the characterized port and on the received sensed measures related to pressure downstream of the characterized port.

In some cases, the pressure sensors 42, 43, 44 may be or include one or more absolute pressure sensors in communication with the microcontroller 36. An absolute pressure sensor may sense an atmospheric pressure adjacent the gas valve assembly 10, and may be configured to communicate and transfer data related to the sensed atmospheric pressure to the microcontroller 36. The microcontroller 36 may take into account the atmospheric pressure from the absolute pressure sensor when determining the flow rate of fluid flowing through the characterized port and/or an estimate of fuel consumption by an attached appliance and/or when determining threshold values. Other sensors may be included in valve assembly 10, for example, one other type of sensor may be a barometric pressure sensor.

As discussed, the valve assembly 10 and the flow module thereof may include temperature sensor(s) 34. The temperature sensor 34 may be positioned within valve body 12 so as to be at least partially exposed to fluid channel 18 and configured to sense a temperature of a fluid (e.g., gas or liquid) flowing through fluid channel 18 and/or any other temperature in fluid channel 18. The temperature sensor 34 may have a first temperature sensor 34a at least partially exposed to the fluid channel 18 upstream of a characterized valve port, and/or a second temperature sensor 34b at least partially exposed to the fluid channel 18 downstream of the characterized valve port, as seen in FIG. 2. When there is a first valve port and a second valve port (e.g., valve ports 20a, 20b), there may be a third temperature sensor 34c in fluid communication with intermediate volume 19 between the first and second characterized valve ports, if desired. The sensed temperature measure may be used by flow module to, for example, compensate, correct, or modify a determined measure (e.g., a density of a fluid) that is related to, for example, a fluid flow rate of fluid flowing through fluid channel 18, which may help improve the accuracy of the flow rate calculation. In operation, the temperature sensor 34 (e.g., any or all of the temperatures sensors 34*a*, 34*b*, 34*c*) may communicate a sensed temperature measure directly or indirectly to the valve controller 26 and/or a non-volatile memory or other memory of the valve controller 26 (e.g., memory in a microcontroller 36 or memory in another location) and/or flow module.

Additionally, or in the alternative, in some instances the pressure sensors 42, 43, 44 may utilize built-in temperature sensors that are used to internally compensate the pressure sensor over the operating temperature range. In such instances, the temperature reading may be accessible at the pressure sensor output (e.g., a digital communication bus) or at another location.

The valve controller 26 may, in turn, utilize the sensed temperature to help increase the accuracy of a determined flow rate of fluid passing through a characterized port and/or increase the accuracy of a calculated fluid and/or fuel consumption quantity, as desired, and store the calculated flow rate of fluid passing through a characterized port and/or the calculated fluid and/or fuel consumption quantity in the non-volatile memory. Additionally or alternatively, the valve controller 26 may, in turn, utilize the sensed temperature (e.g., from temperature sensors 34 and/or pressure sensors 42, 43, 44) when analyzing results of a Valve Leak Detect Test (discussed below), Valve Proving System Test or other test. In one example, the valve controller 26 may monitor a temperature in the valve assembly 10 and/or an intermediate volume of the valve assembly 10 during a test and if there is a change in temperature greater than a threshold, the valve controller 26 may automatically decide to repeat the test, accept the test results at the changed temperature, and/or provide a notification of the change in temperature.

In some instances, the valve controller 26 may be configured to pass on positioning information and/or other sensed information to remote devices through communication lines (e.g., communication link 100) and/or display positioning data of valve sealing member and/or other sensed data on one or more displays 76 attached to and/or in communication with the valve assembly 10 and/or remote devices. In one example, the valve controller 26 may indicate a closed or open position of valve sealing member or a degree (e.g., 10%, 20%, 30%, etc.) of an opening of valve sealing member with one or more visual indicators on or comprising display(s) 76, such as one or more light emitting diodes (LEDs) acting as a visual indication of a valve state and/or position, liquid crystal displays (LCDs), a touch screen, other user interfaces and/or any other display interfacing with or displaying information to a user.

Valve Leakage Test (A.K.A Bubble Leak Test)

The valve controller 26 may be configured to perform a Valve Leakage (VL) Test on the valve assembly 10. In an illustrative operation, a VL test may be performed on a valve assembly 10 that is coupled to a non-switched gas source, or other gas source, that is under a positive pressure during the VL test to test gas valve assembly 10 for leaks.

In some cases, the valve controller 26 may be manually initialized by a field service technician or other user at either a local display 76 on or near the valve assembly 10 (e.g., when valve controller 26 controls the operation of the VL test) or at a remote display 52, 62 (e.g., when either the valve controller 26 controls the operation of the VL test or when the VL test is remotely controlled). Further discussion of using a human-machine interface (HMI) (e.g., computing devices having or computing devices (e.g., field tools) interacting with displays 76, 52, 62, and/or other computing devices) for setting up and/or monitoring a VL test is discussed below. Alternatively, or in addition, the valve controller 26 may be configured to initiate a VL test.

A structural set up of the valve assembly 10 for a VL test may include valve controller 26 in communication with a pressure sensor 44 that may be in fluid communication with intermediate volume 19 between two valve ports 20 (e.g., first valve port 20*a* and second valve port 20*b*), as seen in FIG. 2. Where valve controller 26 is in communication with the pressure sensor 44, the valve controller 26 may be configured to determine a measure related to a pressure change rate (e.g., pressure rise or decay rate, or other measure) in the intermediate volume 19 when both the first valve port 20*a* and the second valve port 20*b* are closed.

Alternatively, or in addition, the valve controller 26 may be in communication with one or more of the inlet pressure sensor 42, the outlet pressure sensor 43 or other pressure sensors, where the pressure sensors 42, 43 sense measures related to the pressure upstream of a first port 20*a* and downstream of a second port 20*b*, respectively, and communicate the sensed measures to valve controller 26. Although pressure sensors downstream of the ports (e.g., pressure sensor(s) 43) may not be directly used to determine whether a valve is leaking, the downstream pressure sensor(s) 43 may continuously monitor outlet pressure during leakage tests of the valves and, in some cases, may facilitate determining which valve is leaking if a valve leakage is detected. In some cases, utilizing an inlet pressure sensor 42 in addition to or as an alternative to pressure sensor 44 may facilitate controller 26 to determine in real time which valve port 20 is leaking and by how much. By using the pressure sensor 42 at the inlet, the inlet pressure may be known prior to a VL test sequence (e.g., discussed below), and the controller 26 may pre-determine thresholds for pressure rise and decay based on knowing the inlet pressure prior to the VL test sequence. In some instances, the valve controller 26 may be configured to detect if a VL test is occurring by monitoring gas valve assembly 10 and signals communicated to gas valve assembly 10. For example, the valve controller 26 may monitor valve actuators 30*a*, 30*b*, first control signal (MV1) controlling first valve actuator 30*a* and/or second control signal (MV2) controlling second valve actuator 30*b*, and/or the states of valve ports 20*a*, 20*b* to identify if a valve proving sequence (VPS) test or a longer VL test is occurring. In some cases, first and second control signals (MV1 and MV2) may be controlled by a combustion appliance in communication with the valve assembly 10 or a field tool in communication with the valve assembly 10 or any other tool or individual in communication with the valve assembly 10. If a VL test is initiated and/or detected, the valve controller 26 may automatically apply thresholds associated with the longer VL test rather than thresholds of a shorter (VPS) test while monitoring the valve assembly 10 during the test.

The VL test may be performed in the same manner or similar manner as a VPS test. However, in the VL test, the test duration may be longer than a test duration of a VPS test (e.g., one minute, two minutes, several minutes, or other time period that may possibly be longer than a typical length of time it may take to run a VPS test), where the duration of the VL test may allow for detecting smaller leaks. Also, the thresholds values used during the VL test may be different from those used in a VPS test. Further, the VL test may be performed less frequently than the VPS test. For example, the VL test may be performed once a year or during routine maintenance, and not during every combustion cycle.

All or substantially all of the structure required for the VL test may be integrated directly into the valve assembly 10. When so provided, the direct integration may allow sensors and electronics needed for VL testing to share a common housing. VL tests may be performed on each of the valve ports 20 and the length of a VL test may depend, at least in part, on the inlet pressure, size of the intermediate volume 19, volume of the appliance combustion chamber, a leakage threshold level, etc.

VL test threshold values may be included in the memory 37 of the valve controller 26 or other memory (e.g., remote memory in communication with the valve controller 26). For example, the memory 37 may include a first VL test threshold value (e.g., for comparing to a pressure rise) and a second VL test threshold value (e.g., for comparing to a pressure decay) utilized in performing the VL test. The valve controller 26 may further be configured to compare determined measures related to a pressure change rate in the intermediate volume 19 to the first and/or second threshold values during the VL test.

The VL test may be achieved by commanding the valve actuators 30 to open and/or close in a useful sequence. This VL test sequence may be initialized and/or controlled through the valve controller 26 and/or a remote computing device. When the VL test sequence is initialized and controlled remotely (e.g., remote from valve controller 26) through the remote computing device, the valve controller 26 may be configured to detect if the VL test or another test is occurring by monitoring gas valve assembly 10 and signals communicated to the valve assembly 10.

In performing a VL test, the valve controller 26 may cause or identify the following first predetermined sequence. The first valve actuator 30a may close the first valve port 20a (if not already closed). The second valve actuator 30b may then open the second valve port 20b (if not already opened) to depressurize the intermediate volume 19 between the first valve port 20a and the second valve port 20b. The second valve actuator 30b may then close the second valve port 20b to seal the depressurized intermediate volume 19.

The valve controller 26 may cause or identify this first predetermined sequence as a first sub-test of a VL test, and the valve controller 26 may be configured to monitor and/or compare a measure that is related to the pressure change rate in the intermediate volume 19 over a first predetermined time period to a first VL sub-test threshold value prior to, during, or after a first sub-set VL duration. After or while comparing the measure related to the pressure change rate in the intermediate volume 19 to the first sub-test threshold value, the valve controller 26 may output a signal if the measure meets and/or exceeds the first sub-test threshold value.

The valve controller 26 may be configured to output the signal over the communication link 100 (e.g., a communication bus) or using a simple pair of contacts (e.g., relay contacts that close when a measured pressure surpasses a threshold pressure value) at or in communication with appliance controller 60, to one or more of a local display 76, a remote device 50, 60, a human machine interface 80 (described below) and/or a remote display 52, 62 of the remote device(s) 50, 60. The displays 52, 62, 76 may include and/or be in communication with an input device (e.g., touch-screen, keyboard, mouse, track pad, etc.) to form the Human Machine Interface (HMI). The first sub-test of the VL test may be configured to at least detect a leaking first valve port 20a. The outputted signal may indicate, or may cause to be indicated, a valve leakage within valve assembly 10 and/or a measure of the magnitude of the valve leakage.

Alternatively, or in addition to identifying the first sub-test of a VL test, the valve controller 26 may cause or identify the following second predetermined sequence. The second valve actuator 30b may close the second valve port 20b (if not already closed). The first valve actuator 30a may then open the first valve port 20a (if not already opened) to pressurize the intermediate volume 19 between the first valve port 20a and the second valve port 20b. The first valve actuator 30a may then close the first valve port 20a to seal the pressurized intermediate volume 19.

The valve controller 26 may cause or identify this second predetermined sequence as a second sub-test of a VL test, and the valve controller 26 may be configured to monitor and/or compare a measure that is related to the pressure change rate in intermediate volume 19 over a second predetermined time period to a second VL sub-test threshold value prior to, during, or after a second sub-set VL duration. After or while comparing the measure related to the pressure change rate in the intermediate volume 19 to the second sub-test threshold value, the valve controller 26 may output a signal if the measure meets and/or exceeds the second sub-test threshold value.

The valve controller 26 may be configured to output the signal to one or more of a local display 76, a remote device 50, 60, a human machine interface 80 (described below) and/or a remote display 52, 62 of the remote device(s) 50, 60. The second sub-test of the VL test may be configured to at least detect a leaking second valve port 20b. The outputted signal may indicate, or may cause to be indicated, a valve leakage within valve assembly 10 and/or a measure of the magnitude of the valve leakage. Further, the first VL sub-test and the second VL sub-test of the VL test may be performed in any order, as desired.

The first and second VL sub-test threshold values may be programmed into the valve controller 26 for respective predetermined time periods, and the first and second VL sub-test threshold values may be different or substantially the same value. Alternatively, or in addition, the valve controller 26 may be configured to calculate the first and second VL sub-test threshold values based on one or more parameters and, in some instances, the valve controller 26 may be configured to store the first and second VL sub-test threshold values. The one or more parameters that valve controller 26 may consider if it is determining a VL sub-test threshold value include, but are not limited to, a sensed pressure, a sensed temperature, max flow rate of the system, a number of ON-OFF cycles operated up to a point in time, volume of the flow channel 18, altitude of the valve assembly 10, barometric pressure, absolute pressure, gas type (e.g., density), ANSI requirements, EN requirements, other agency requirements, an allowed VL test duration (e.g., predetermined time periods), and how small of a leak is to be detected, etc. Further, in the event more than two sub-tests are performed as part of the VL test, there may be more threshold values than the first and second VL sub-test threshold values, if desired.

A similar VL test performed on the valve assembly 10 may include opening one of the first and second valve port 20a, 20b with the other of the first and second valve ports 20a, 20b remaining or being closed. After opening one of the first and second valve ports 20a, 20b, closing the opened valve port such that both valve ports 20a, 20b are closed such that a first initial gas pressure may be present in the intermediate volume 19. An intermediate pressure sensor 44 may continuously or discontinuously sense a pressure in the intermediate volume 19, including the first initial pressure therein, and send the sensed pressures to the valve controller 26. The initial pressure in the intermediate volume 19 may be sensed at any time, for example, the initial pressure may be sensed after opening one of the valve ports 20a, 20b and before closing that opened the valve port 20a, 20b.

The valve controller 26 may monitor (e.g., continuously or discontinuously), over time, the pressure in intermediate volume 19 and determine a first measure that is related to a pressure change rate within the intermediate volume 19 while both valve ports 20a, 20b are in a closed position. After determining the first measure that is related to a pressure change rate within the intermediate volume 19, the valve controller 26 may compare the determined first measure related to a pressure change rate in the intermediate volume 19 to a first threshold value stored in the valve controller 26. The valve controller 26 may then output to a local display 76, a display 52, 62 of the remote devices 50, 60, and/or the remote device 50, 60 or other device an output signal that is related to the first measure related to the pressure change rate (e.g., a determined pressure change in the intermediate volume 19, or other determined measure), where outputting the output signal may also include storing the determined first measure related to the pressure change rate in memory 37 on valve controller 26 or other memory. Optionally, the valve controller 26 may output the output signal if the determined first measure meets and/or exceeds the first threshold value. The output signal, however, may convey any information, as desired. For example, the output signal may convey information related to when (e.g. time stamp) the determined measure that is related to the pressure change rate meets and/or exceeds a threshold value, or other information related to or not related to the pressure in the intermediate volume 19. In an alternative, or in addition, to providing the output signal, a visual and/or audible indicator may be provided to indicate if the valve assembly 10 passed or failed the VL test.

In addition, the first and/or second valve port 20a, 20b may be manipulated such that a second initial gas pressure may be present in the intermediate volume 19 while the first and second valve ports 20a, 20b are in the closed position. For example, the second valve port 20b may be closed, then the first valve port 20a may be opened to pressurize intermediate volume 19 and then closed to seal in the second initial pressure. The second initial pressure may be substantially different than the first initial gas pressure, as the first initial pressure may be associated with a depressurized state of the intermediate volume 19 and the second initial pressure may be associated with a pressurized state of the intermediate volume 19, for example. Similar to above, the intermediate pressure sensor 44 may sense pressure within the intermediate volume 19 and communicate the sensed pressure and measures related to the sensed pressures to the valve controller 26. The valve controller 26 may monitor (e.g., continuously or discontinuously), over time, the pressure in intermediate volume 19 and determine a second measure that is related to a pressure change rate within the intermediate volume 19 while both the valve ports 20a, 20b are in the closed position. After determining the second measure that is related to a pressure change rate within the intermediate volume 19, the valve controller 26 may compare the determined second measure related to a pressure change rate in the intermediate volume 19 to a second threshold value stored in the valve controller 26. The valve controller 26 may then output to the local display 76, the display 52, 62 of remote device 50, 60, and/or remote device 50, 60 or other device an output signal that is related to the second measure related to a pressure change rate, where outputting the output signal may also include storing the determined second measure related to the pressure change rate in memory 37 on valve controller 26. Optionally, the valve controller 26 may output the output signal or a different output signal if the determined second measure meets and/or exceeds the second threshold value. The output signal, however, may convey any information and the outputted signals may be outputted in any situation. Further, the output signal may be configured to provide, or cause to be provided, a visual and/or audible indicator to indicate if valve assembly 10 passed and/or failed the VL test.

In some cases, the valve controller 26 may interpret the results of the VL test in view of a sensed temperature. In one example, if the valve controller 26 detects a change in temperature greater than a threshold and/or a temperature that has crossed a threshold, the valve controller may automatically repeat the VL test, accept the test results at the changed or sensed temperature, provide a notification, and/or automatically take one or more other actions.

The steps of the illustrative VL test may be performed once such as when the gas valve assembly 10 is installed or during routine maintenance, and/or at other times. In any case, the valve controller 26 or other device, or even a user, may identify a trend in the stored determined measures related to the pressure change rate or in other data sensed, calculated and/or stored during the valve leakage tests. A determined trend may be used for any of many purposes, for example, a trend may be used to predict when the valve will require replacement and/or servicing, and/or to make other predictions. Further, a VPS test and/or leakage test may be initiated and/or operated dependent on or independent of an attached device (e.g., a combustion appliance controller 60). In such an instance, valve controller 26 may be configured to initiate and operate a VPS test and/or leakage test independent of an attached device and may be configured to disable a heat call or other signal to and/or from an attached device, when appropriate.

User Interface for VL Test

As referred to above, a Human Machine Interface (HMI) 80 may be utilized for setting up and/or monitoring a VL test, and may include a user interface and/or software. The HMI 80 may be and/or may include any type or number of computing devices. Illustratively, the HMI 80 may be a laptop, a mobile phone, a tablet computer, a personal computer, etc. that may communicate with the valve controller 26 via the electronics connection port 45 of the valve assembly 10 or other wired or wireless connection. In some cases, the HMI 80 may be or may include one or more of the local display 76, the system display 52, and the appliance display 62.

Figure 3:
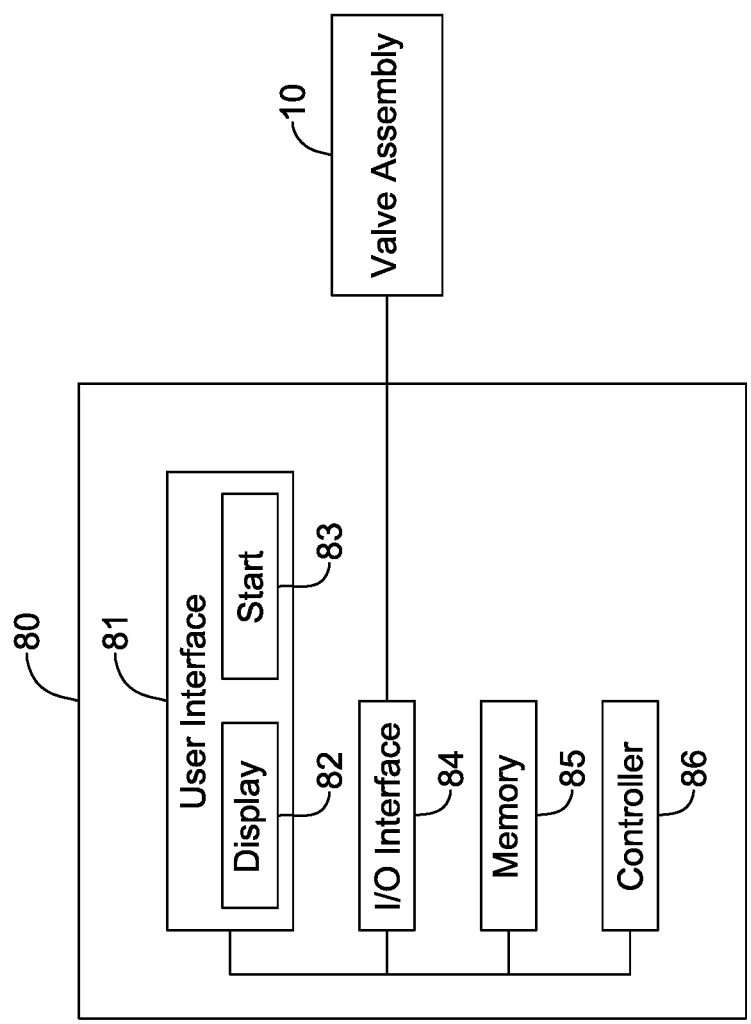
FIG. 3 is a schematic diagram showing an illustrative human machine interface interfacing with a valve assembly.

FIG. 3 depicts an example HMI 80 in communication with the valve assembly 10 (e.g., valve controller 26). The HMI 80 depicted in FIG. 3 may include a user interface 81, an input/output (I/O) interface 84, memory 85, and a controller 86. The HMI 80 may include other features as desired.

In some cases, the user interface 81 may include a display 82, and in some cases a start button 83, where the start button may be configured to initiate sending a signal to initiate a test on the valve assembly 10. Additionally or alternatively, the user interface 81 may include one or more input devices. For example, the display 82 may include a touch screen display, a keyboard, a mouse, a track pad, a microphone (e.g., for voice to text commands), and/or one or more other input devices. In some cases, the start button 83 may be a button on the display 82, where the display 82 may be a touch screen display. Alternatively or in addition, the start button 83 may be an input button separate from the display 82.

The I/O interface 84 may be any type of I/O interface for sending information and/or receiving information. In one example, the I/O interface 84 may include a wired and/or wireless interface configured to communicate over a non-proprietary protocol and/or a proprietary protocol. Illustratively, the I/O interface may utilize a wired connection to connect to the electronic connection port 45 (e.g., a wired and/or wireless connection port) of the valve assembly 10 and/or a wireless connection to communicate with the valve assembly 10. The communications protocols over which the I/O interface 84 may wirelessly communicate may include, but are not limited to, Near Field Communication (NFC), ZIGBEE, Bluetooth®, Bluetooth® Low Energy (BLE), WiFi, Infrared Data Association (IrDA), radio frequency, and/or one or more other communication protocols.

The memory 85 may include any type of volatile and/or non-volatile memory and may include any number of pieces of memory. In one example, the memory 85 may include one or more of FLASH memory, Read Only Memory (ROM), Random Access Memory (RAM), and/or other types of memory.

The controller 86 may be any type of controller. In one example, the controller 86 may be or may include a microcontroller having a processor configured to execute instructions from memory 85 and/or other memory. The HMI controller 86 may be configured to receive an initiation of a test for the valve assembly 10 via the user interface 81 and in response, send a signal to the valve assembly 10 via the I/O interface 84 to initiate a test (e.g., a VL test, a VPS test, or other test) on the valve assembly 10.

Figure 4:
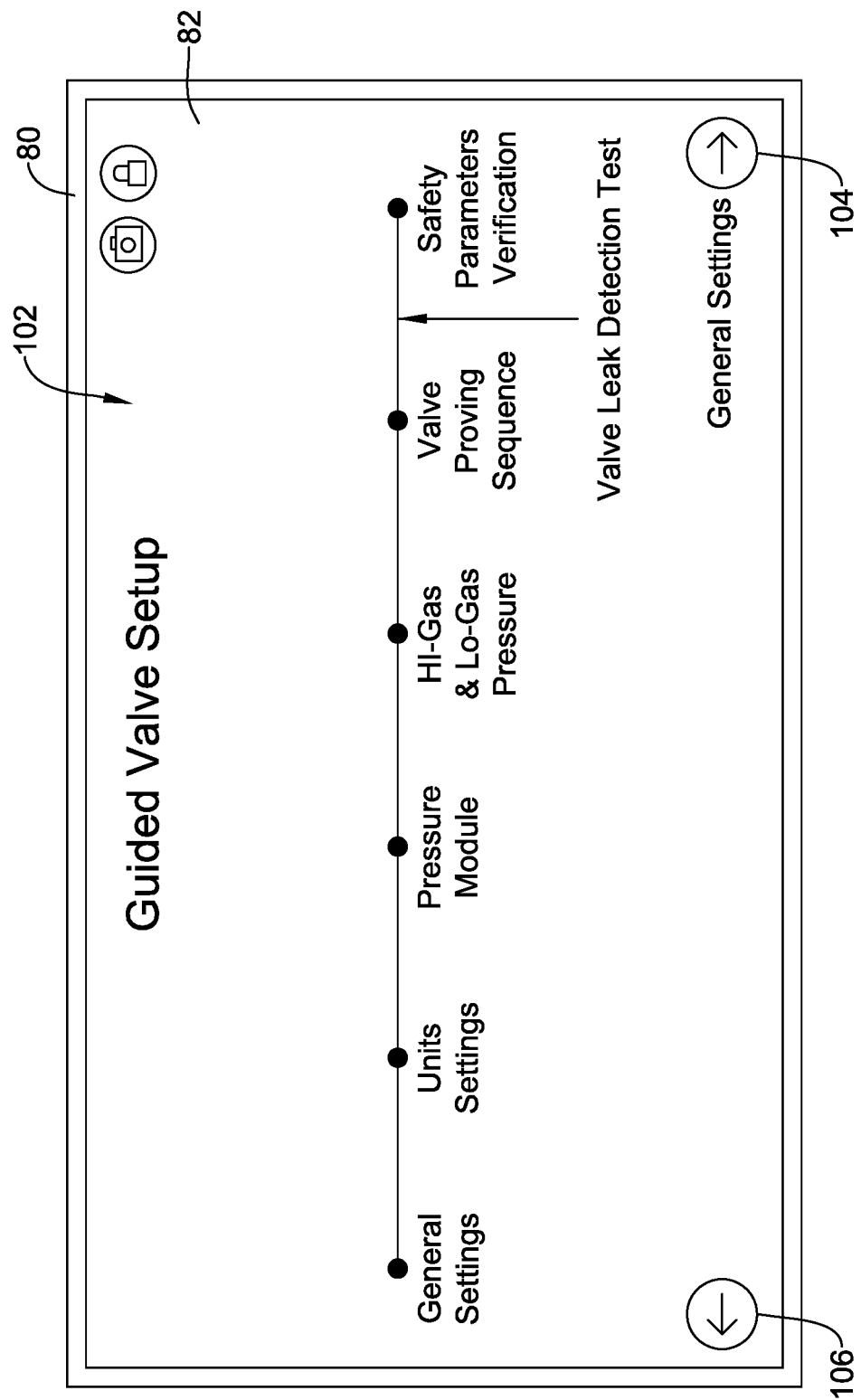
FIG. 4 is a schematic diagram showing an illustrative setup status screen displayed on a display of a human machine interface.

As shown in FIG. 4, the HMI 80 may display a screen 102 depicting a guided valve setup process. The illustrative guided setup process may guide a user through valve assembly 10 settings that may include, but are not limited to, general settings, user settings, pressure module settings, hi-gas and low-gas pressure settings, VPS test settings, VL detection test (Bubble Leak test) settings, safety parameters verification settings, and/or other settings and/or configurations. In the example shown, to go to a next step or screen when interacting with the HMI 80, a user may select a forward arrow 104 and to return to a previous screen, a user may select a back arrow 106.

Figure 5:
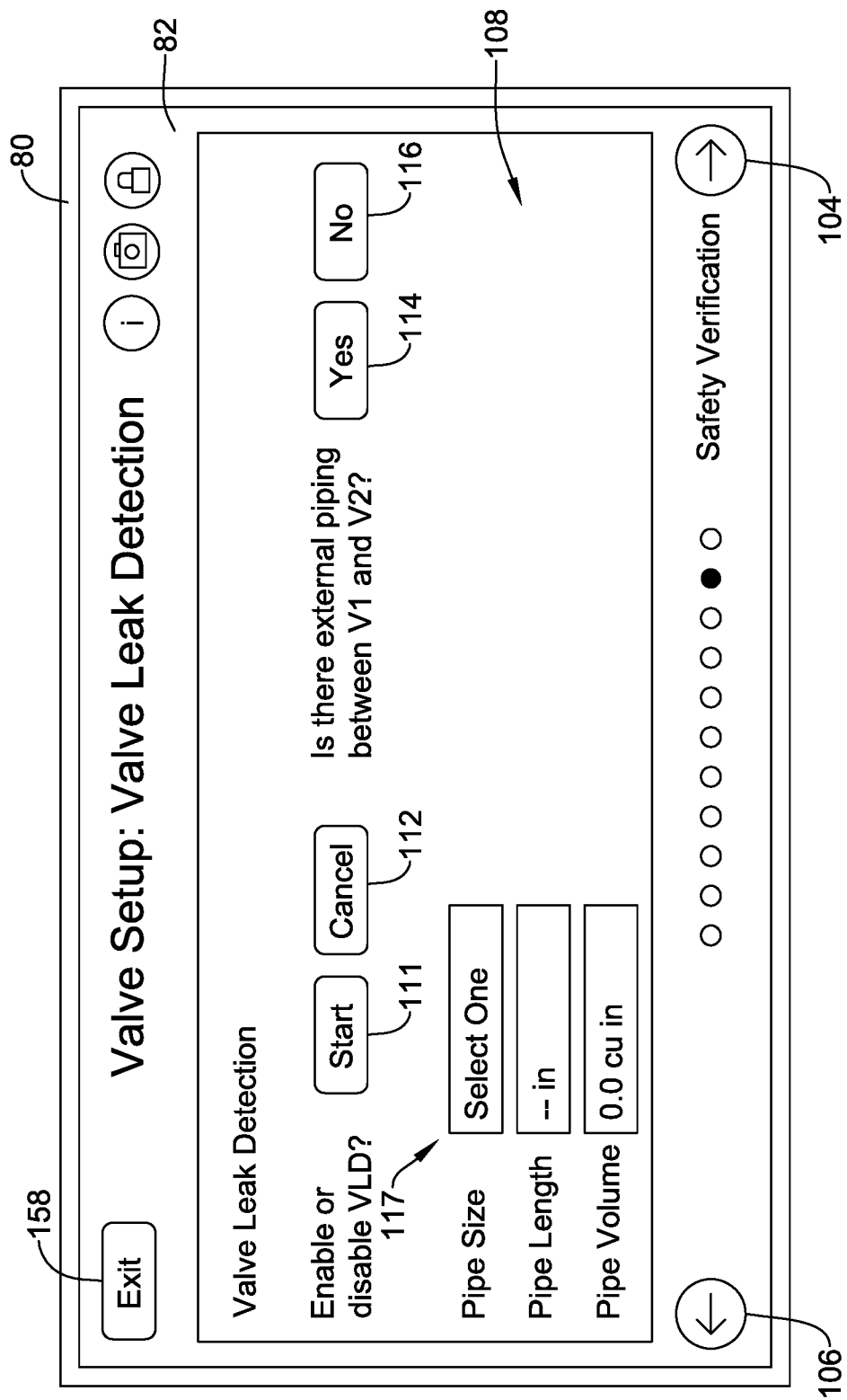
FIG. 5 is a schematic diagram showing an illustrative valve leak detection test set up screen displayed on a display of a human machine interface.

FIG. 5 is an illustrative VL test setup screen 108. From screen 108, a user may be able to select an START button 111 for enabling a VL test or CANCEL button 112 for disabling a VL test. Buttons 111, 112 may provide the user with the ability to run a VL test or prevent the HMI 80 from initiating a VL test. Additionally or alternatively, the screen 108 may request information about the setup of the valve assembly 10. In one example, the screen 108 may ask whether there is external piping between a first valve and a second valve and a user may select from a YES button 114 and a NO button 116. Other buttons or selection mechanisms may be used, as desired. If the YES button 114 is selected, the screen 108 may ask for information such as pipe size, pipe length, pipe volume, and/or other information related to the valve assembly 10 as shown at 117. In some cases, more or less information may be requested in the screen 108, and/or information may be requested on one or more subsequent VL test setup screens 108. Once the VL test has been setup, and in the example shown, a user may select the forward arrow 104 to move onto the next step of setting up the valve assembly 10.

In some case, it may be possible for the HMI 80 to set up a VL test automatically based, at least in part, on the settings for a VPS test. In such cases, a user may not need to enter information into VL test setup screens 108 as it may be pre-filled based on the VPS test settings or may not be provided as a screen during the setup of the valve assembly 10.

Figure 6:
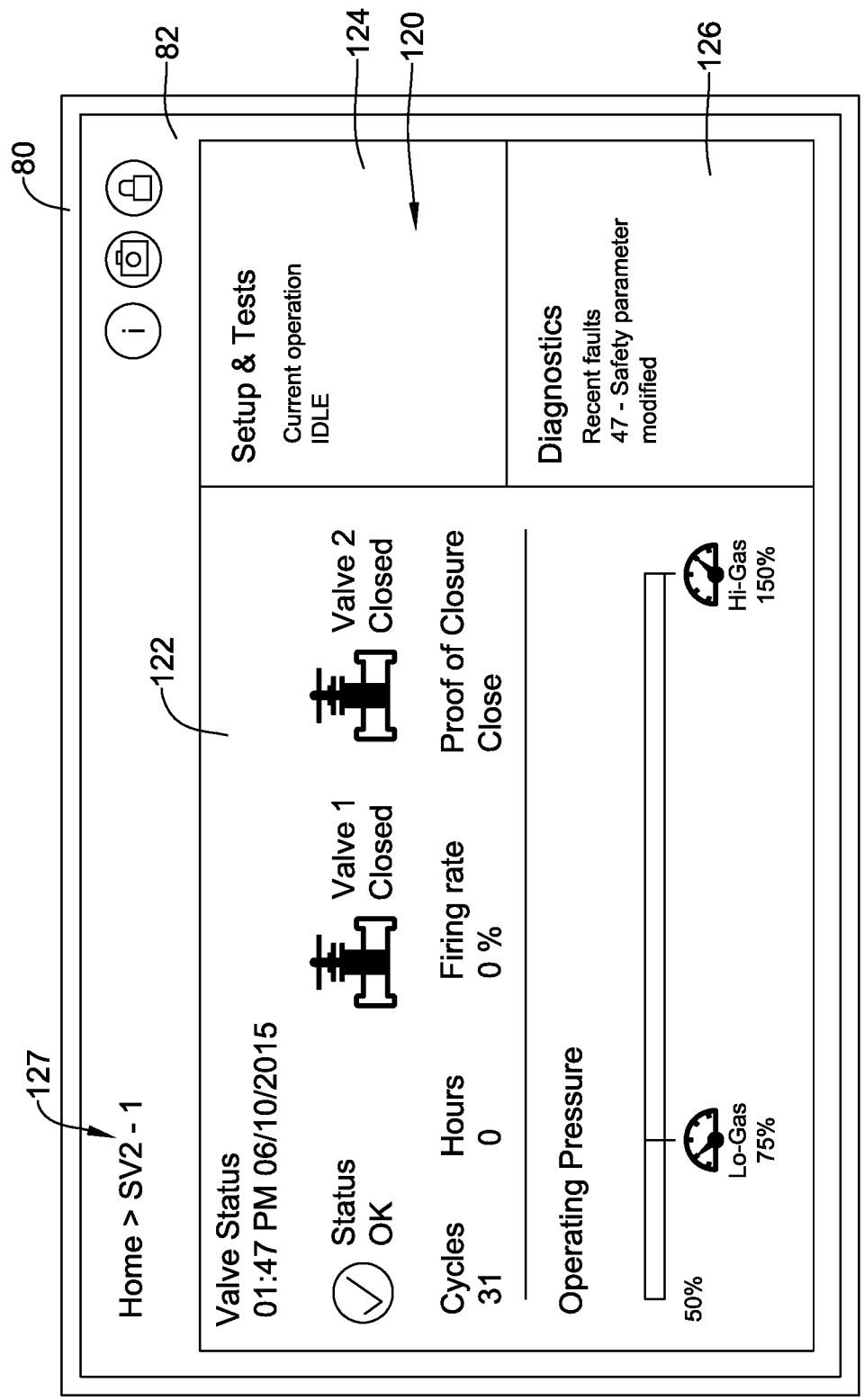
FIG. 6 is a schematic diagram showing an illustrative valve assembly status screen displayed on a display of a human machine interface.

Once the valve setup process has been completed, the display 82 may display a valve assembly monitoring screen 120. In FIG. 6, the example monitoring screen 120 may have a valve status section 122, a setup and tests status section 124, and a diagnostics section 126. One or more of these sections 122, 124, 126 may be selected for more detailed information about valve status, setup and tests status, and diagnostics, respectively. Second level screens (e.g., screens depicted on display 82 after selecting a section 122, 124, 126) may include a navigation heading 127 that may provide a user an indication of where in a hierarchy of screens the user is (e.g. breadcrumbs).

The valve status section 122 may include information about the current operating conditions of the valve assembly 10. In one example, the valve status section 122 may include information about the operating pressure, low gas pressure thresholds, high gas pressure thresholds, position information (opened/closed) for each valve of the valve assembly 10, number of cycles of the valve assembly 10, hours of operation of the valve assembly 10, a firing rate, a proof of closure status, and/or other information about the operation of the valve assembly 10. Such information may be populated and/or updated when the HMI 80 is connected to the valve assembly The diagnostics section 126 of the monitoring screen 120 may display information related to diagnostics of the valve assembly. In one example, the diagnostics section 126 may display any faults that have occurred with the valve assembly 10 and/or other information related to the diagnostics of the valve assembly 10.

The setup and tests status section 124 may display information related to the tests that may be performed on the valve assembly. In one example, the setup and tests status section 124 may display a current status of tests and if no tests are currently performed and/or there are no new results of tests to report, the section 124 on screen 120 may indicate that testing is IDLE as shown.

Figure 7:
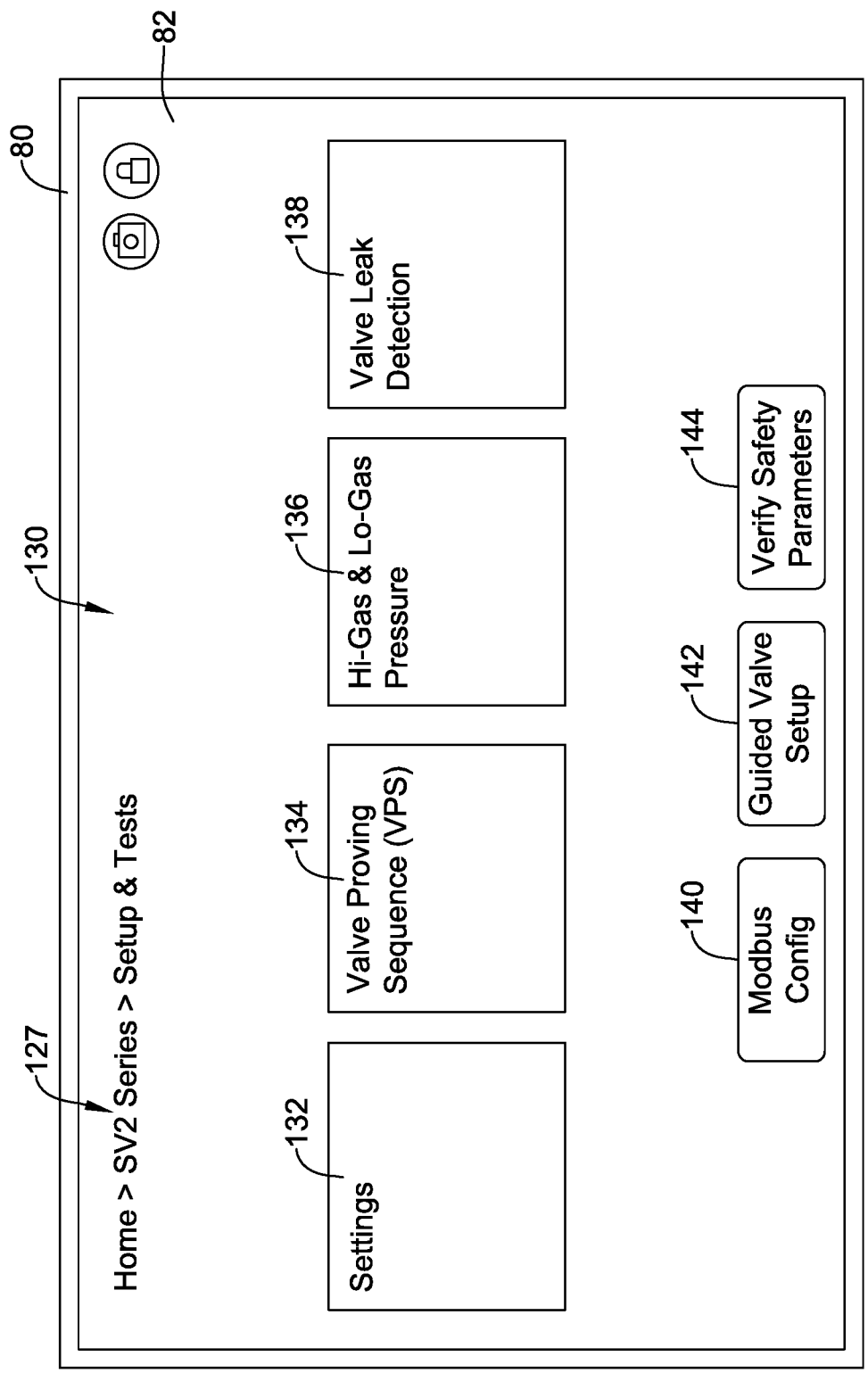
FIG. 7 is a schematic diagram showing an illustrative setup and tests screen displayed on a display of a human machine interface.
Figure 8A:
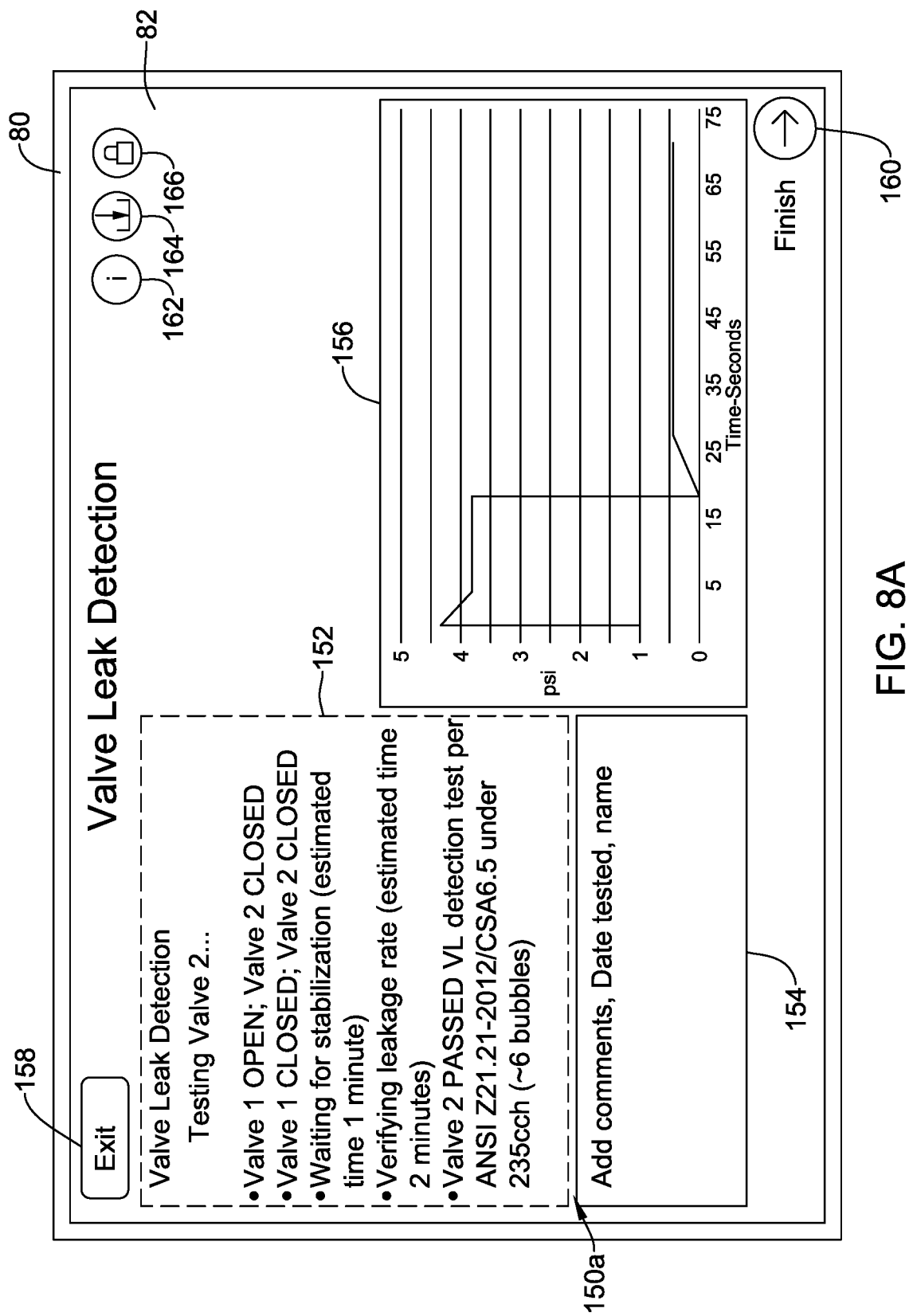
FIGS. 8A and 8B are schematic diagrams showing illustrative valve leak detection monitoring screens displayed on a display of a human machine interface.
Figure 8B:
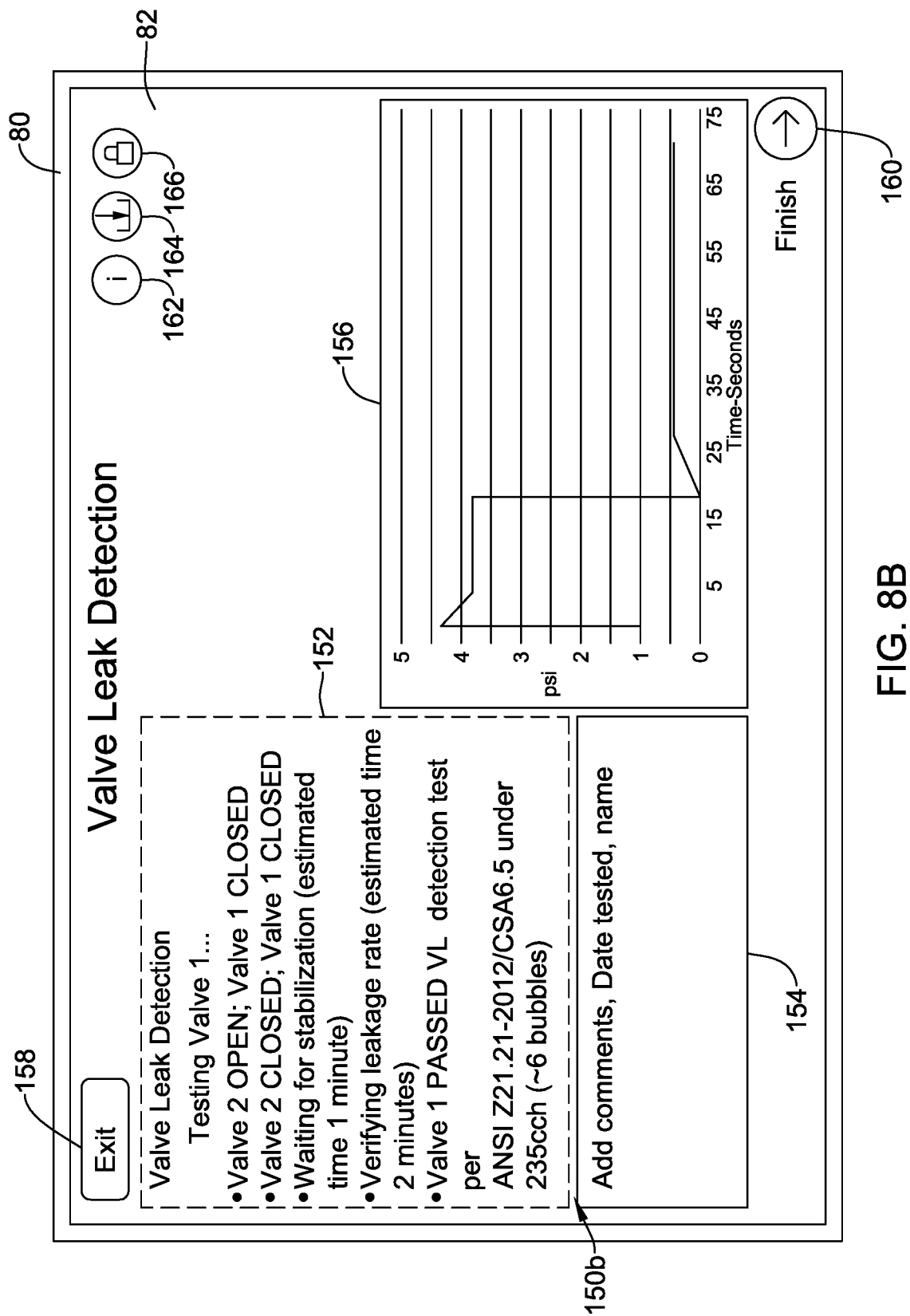
Figure 9:
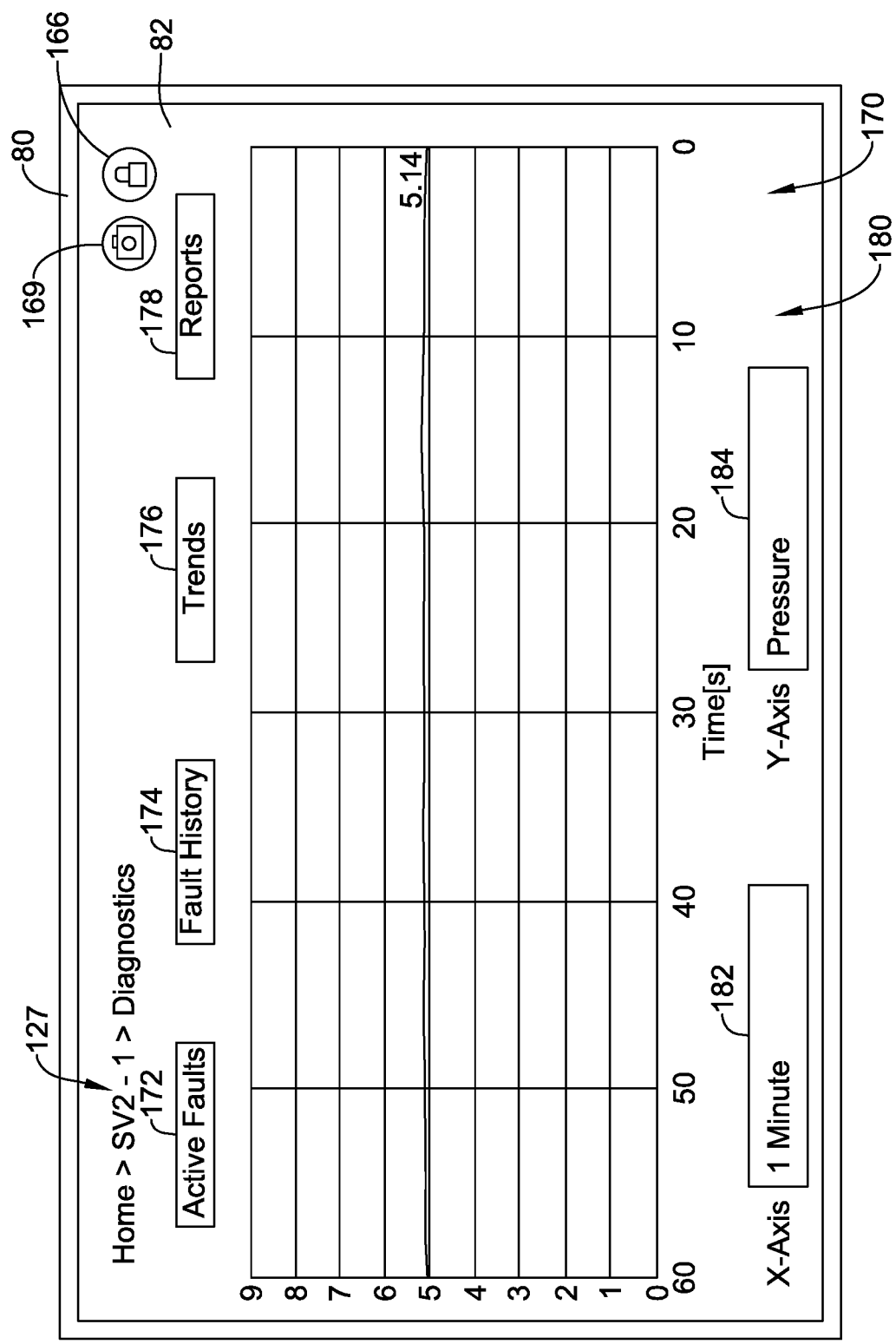
FIG. 9 is a schematic diagram showing an illustrative diagnostics screen depicting valve assembly trends displayed on a display of a human machine interface.
Figure 10:
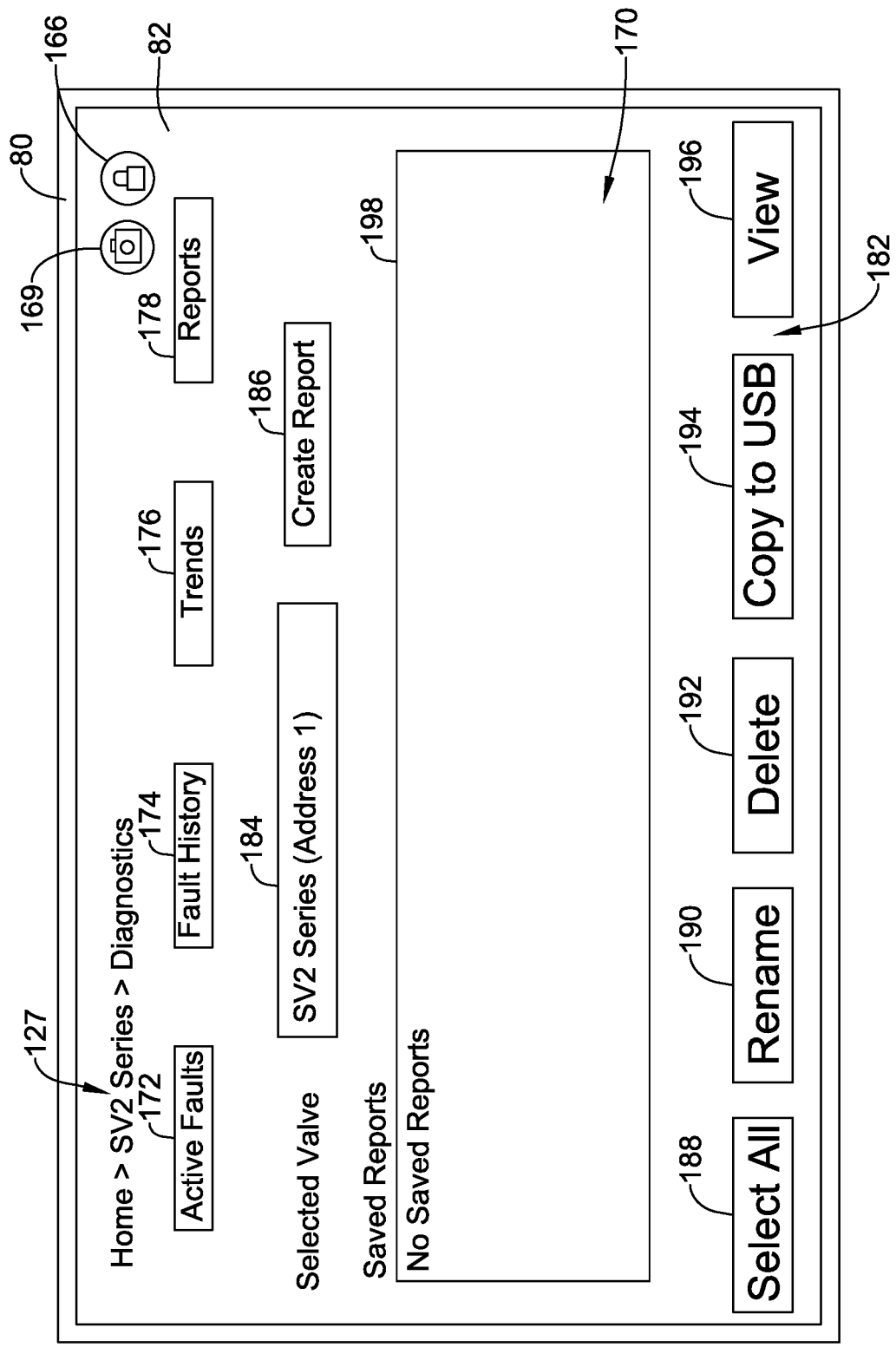
FIGS. 10 and 11 are schematic diagrams showing illustrative diagnostics screens depicting valve assembly reports displayed on a human machine interface.
Figure 11:
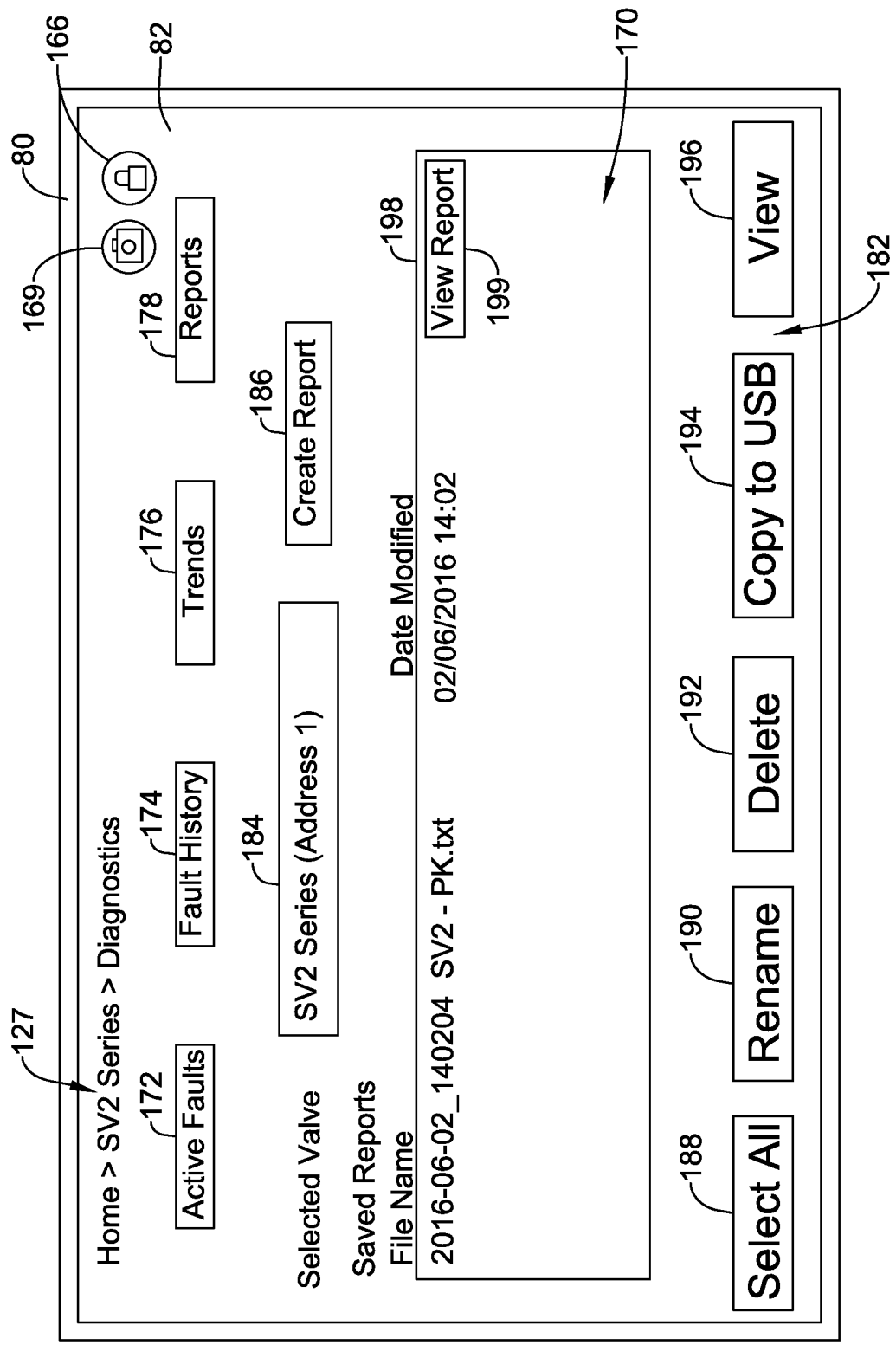

In some cases, and as mentioned above, the sections 122, 124, 126 of the monitoring screen 120 may be selectable to obtain further information about the respective sections. FIGS. 7-8B depict illustrative screens on the display 82 that detail further information concerning the setup and tests status section 124 of the monitoring screen 120. FIGS. 9-11 depict illustrative screens on the display 82 that detail further information concerning the valve assembly diagnostics section 126 of the monitoring screen 120.

When a user selects the setup and tests status section 124 of the monitoring screen 120, a setup and tests home screen 130 may be displayed on the HMI display 82, an example of which is shown in FIG. 7. One or more selectable buttons or boxes or other selectable features may be displayed for selection and advancing to one or more detailed screens and/or initiating a selected test. As shown in FIG. 7, selectable boxes may include a settings box 132, a VPS box 134, a hi-gas and low-gas pressure box 136, and a VL (bubble leak) detection box 138. Other boxes for tests and/or settings may be provided as desired. One or more (e.g., each) of the buttons 132, 134, 136, 138 or other buttons on the HMI 80 may be selected to initiate sending a signal to initiate a test associated with the box (e.g., selection of the VL detection box 138 may initiate sending a signal to initiate VL test on the valve assembly 10).

In some cases, other selectable features may be provided on screen 130. In the example shown in FIG. 7, other selectable features may include a Modbus Configuration button 140, a Guided Valve Setup button 142, and a Verify Safety Parameters button 144. Additional and/or alternative other selectable features may be provided on screen 130, as desired.

To initiate a VL test, a user may select the VL detection box 138 (e.g., a start button) as indicated by the bold writing in and outlining of box 138 in FIG. 7. Once the VL detection box 138 has been selected, the HMI 80 may send a signal to the valve assembly 10 (e.g., controller 26) to start a VL test. In response to selecting the VL detection box 138 and initiating a VL test, the HMI 80 may depict VL detection test monitoring screens 150a, 150b, as shown in FIGS. 8A and 8B, which may display received results of the VL test in real time (e.g., during the VL test). Although screens 150a, 150b are depicted as separate screens, the information provided on these screens may be provided on a single screen or more than two screens if desired.

The selectable Valve Leak Detection box 138 may be an example start button 83 of the HMI 80 configured to initiate a VL test. Other start buttons 83 may be utilized to start a VL test including, but not limited to, a start VL test button, a start VL test button separate from the display 82, and/or one or more other selectable features.

The screen 150a depicts a monitoring screen when performing a VL detection test on a second valve (e.g., a downstream valve) and the screen 150b depicts a monitoring screen when performing the VL detection test on a first valve (e.g., an upstream valve). In each of the screens 150a, 150b, there may be a test status portion 152 (note, the dotted box is for references purposes only and may or may not be present on screens 150a, 150b). In the test status portion, each step of the test and/or other current status of the VL test may be listed. For example, as shown in FIG. 8A, the test status portion 152 first indicates "Valve 1 OPEN; Valve 2 CLOSED", then "Valve 1 CLOSED; Valve 2 CLOSED", then "Waiting for stabilization (estimated time 1 minute)", then "Verifying leakage rate (estimated time 2 minutes)", and concludes with "Valve 2 PASSED VL detection test per [e.g., a set standard such as ANSI Z21.21-2012/CSA6.5 under 235 cch (~6 bubbles) or other standard]". Similar test status information may be provided in the test status portion 152 in screen 150b, but relevant to testing the first valve, as shown in FIG. 8B.

Additional and/or alternative VL test status information may be provided in the test status portion 152, as desired, including, but not limited to, time and/or date stamp information, measured positions of the valves, and/or other information. Generally, some current status information of the VL test may include a current pressure stabilization phase of the VL test, a current leakage rate verification stage (e.g., a stage in which a sensed leakage rate is compared to a threshold leakage rate or other stage), whether the valve assembly 10 passed or failed the VL test, and so on.

Screens 150a, 150b may also include a notes section 154. A user may be able to add notes to a record for a VL test by entering those notes in notes section 154. Notes section 154 may be a free form and may allow a user to write any desired comments. Alternatively, or in addition, notes section 154 may have one or more of a free form portion, a check box portion, a drop-down portion, and/or other portions that allow/facilitate providing notes or comments on the VL test.

Any notes may be entered to the HMI 80 through one or more input devices and may include one or more of general comments/observations about the test, a date and/or time the test was initiated, a user (e.g., technician or other user) that initiated the VL test, and/or other information. In some cases, some information provided in the notes section or added to a record for a VL test may be automatically added by the HMI 80. Such information automatically added may be date and/or time of the VL test, a user that initiated the test (e.g., as identified by login information or other means), the test status updates provided in test status portion 152, and/or other information.

In some cases, screens 150a, 150b may include a graph section or data section 156. As shown in FIGS. 8A and 8B, the graph section 156 may depict a measure related to a valve leakage rate such as a pressure in an intermediate volume 19 of the valve assembly 10 over time during the VL test. In some cases, the graph section may be updated in real time. For example, in FIG. 8A, the measured pressure may be added to the graph in real time so that the pressure curve is filled in from left to right with time. Thus, the user can watch the capturing of the pressure curve in real time. At the same time, the test status portion 152 may be updated in real time. When so provided, the user can correlate the measured pressure expressed in the pressure curve with the test status (e.g. "Valve 1 OPEN; Valve 2 CLOSED", "Valve 1 CLOSED; Valve 2 CLOSED", "Waiting for stabilization (estimated time 1 minute)", "Verifying leakage rate (estimated time 2 minutes)") in real time. Other measures related to a valve leakage rate and/or other variables/parameters may be displayed, as desired. In one example, a table of the pressure in the intermediate volume and/or other information may be displayed over time.

In some cases, the screens 150a, 150b may include one or more other selectable portions. As shown in FIGS. 8A and 8B, screens may include an Exit button 158, a Finish button 160, an information button 162 that may provide information about the test or the valve, a download button 164 for downloading a record of the test and/or other information, and a lock button 166, and/or one or more other buttons. To exit the VL test or return to a setup and tests home screen 130, a user may select the Exit button 158. Once a VL test has finished (e.g., the valves being tested have passed or not passed the VL test) and the user is ready to move on, a user may select the finish button 160 to complete the VL test and save a record of the VL test in memory (e.g., memory 85 or other memory). Alternatively, the HMI may automatically advance once the HMI indicates the valves being test have passed or not passed the VL test.

The information on screens 150a, 150b may be stored in the valve assembly 10 (e.g., in the memory 37) rather than or in addition to being stored in the HMI 80. For example, user typed text or other notes, a time and/or date stamp of a test or action, passed/not passed results or other results of a test, leak rates, input pressures, temperatures, etc. may be stored in the valve assembly 10. Such stored information may be available from the valve assembly 10 in report form or other form via an HMI 80 or Modbus address in communication with the valve assembly 10.

In some cases, the diagnostics section 126 may be selected from the monitoring screen 120 shown in FIG. 6. When a diagnostics section 126 has been selected, the display 82 of the HMI 80 may display a screen providing diagnostic information including, but not limited to, active faults, fault history, trends, reports, and/or other diagnostic information.

As shown in FIGS. 9-11, when a diagnostics section 126 is selected from the monitoring screen 120, a second level diagnostics screen 170 may be displayed on display 82. The second level diagnostics screen 170 may provide one or more buttons for selection to view associated diagnostic information. As shown in FIGS. 9-11, illustrative screen 170 may include an Active Faults button 172, a Fault History button 174, a Trends button 176, and a Reports button 178. Other buttons for selection and display of associated diagnostic information may be provided, as desired. Additionally, other selectable features may be provided on the second level diagnostics screen 170 including, but not limited to, a screen shot button 169 and the lock button 166. The screenshot button 169 may save a screenshot of the diagnostic information depicted on the display 82. In some cases, but not necessarily all, a time the screenshot was taken may be saved with the screenshot.

As shown in FIG. 9, the Trends button 176 has been selected and a trends screen 180 is depicted. Alternatively, the diagnostic section 126 may be setup to automatically go to a screen depicting a specific diagnostic when it is selected. The trends screen 180 may depict a trend over time for a particular parameter (e.g., operating pressure as shown in FIG. 9). In some cases, the time over which the trend information is provided may be selected from an x-axis box 182 (e.g., thirty (30) seconds, one (1) minute, two (2) minutes, five (5) minutes, ten (10) minutes, fifteen (15) minutes, thirty (30) minutes, one (1) hour, one (1) day, one (1) week, one (1) month, one (1) year, and/or other time period). Additionally, or alternatively, the parameter for which trending information is displayed may be selected from y-axis box 184 (e.g., pressure, time, etc.). As is shown in FIG. 9, trend information (e.g., an average of 5.14 units of pressure) for operating pressure over a one-minute period may be provided. Trends of other parameters and time periods are contemplated.

As shown in FIGS. 10 and 11, the Reports button 178 has been selected and a Reports screen 182 is depicted. The Reports screen 182 may provide the ability to create a diagnostics report and/or take one or more actions with respect to reports already created.

As shown in FIGS. 10 and 11, a user may be able to select a valve (e.g., a valve assembly 10) by selecting box 184. Box 184 may include a list of the valves with which the HMI 80 is in communication. By selecting a box 184, a user may be presented with a list of valves and a valve may be selected from the list. As shown in box 184 of FIGS. 10 and 11, valve "SV2 Series (Address 1)" has been selected.

In FIG. 10, it can be seen that no reports for the selected valve are listed in a report list section 198. To create and add a report to the report list section 198, a user may select a Create Report button 186. Once the Create Report button 186 has been selected, a report of the diagnostics for the valve assembly 10 may be created and added to the report list section 198, as shown for example in FIG. 11.

Once one or more reports have been created and added to the report list section 198, a user may view one or more of the reports in the report list section 198 by selecting an associated View Report button 199. Alternatively or in addition, a user may view a report by selecting a listed report and the selecting the View button 196. In some cases, if a user would like to select all of the reports in the report list section 198, the user may select a Select All button 188 and all of the reports in the report list section 198 will be selected (e.g., as indicated by a highlight) for a further action.

Further actions may be taken on selected saved reports by selecting one or more buttons on the reports screen. In some cases, action buttons may be located below the report list section 198 as shown in FIGS. 10 and 11, but this is not required. Example action buttons may include, but are not limited to, a Rename button 190, a Delete button 192, a Copy To USB button 194 or other removable drive, the View button 196, and/or one or more other selectable features. In some cases, one or more actions may be taken on selected reports by going to a drop-down menu, right-clicking, and/or by making one or more other selection.

Figure 12A:
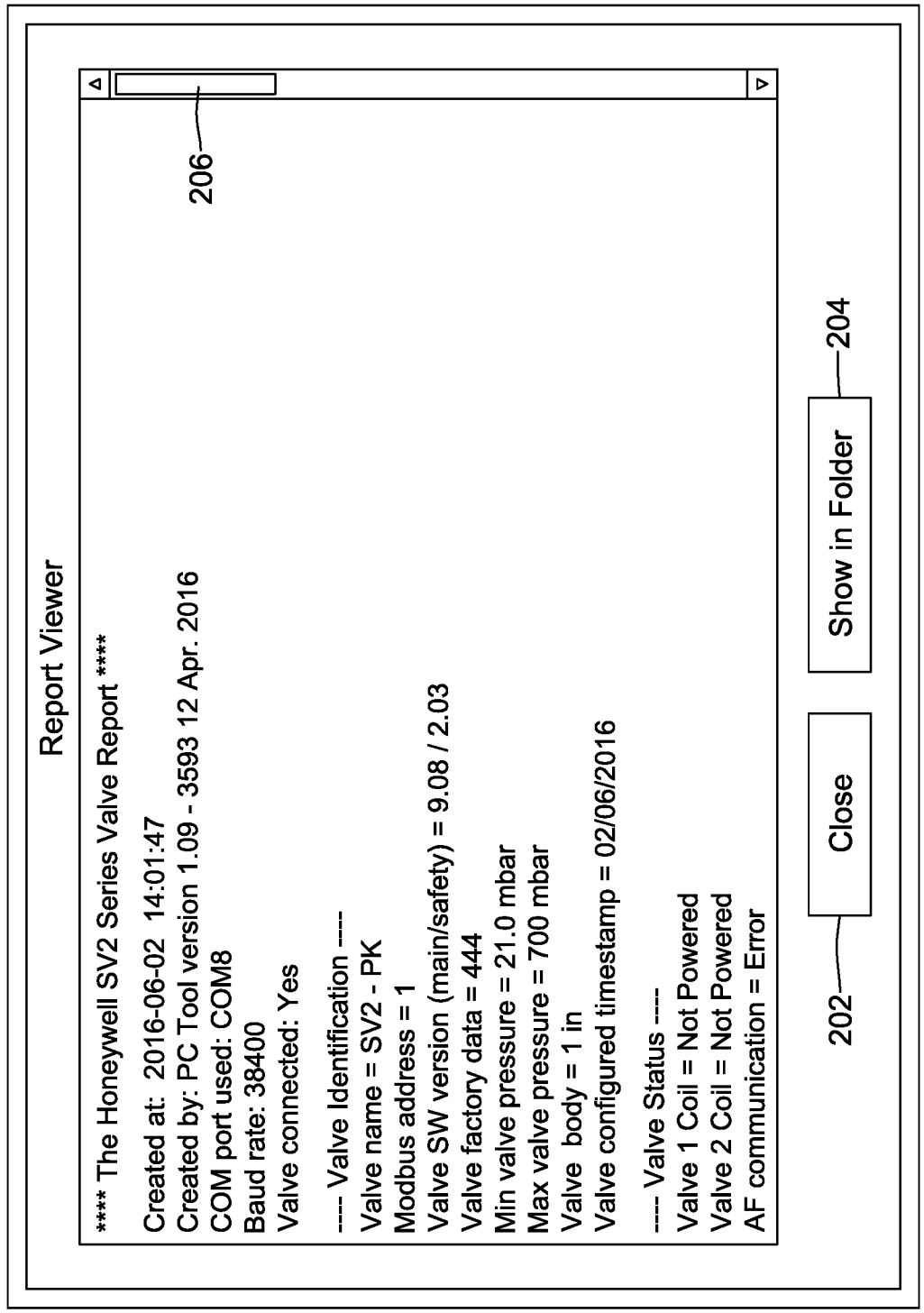
FIGS. 12A-12C are a schematic diagrams showing an illustrative screen depicting a report as the screen is scrolled down.
Figure 12B:
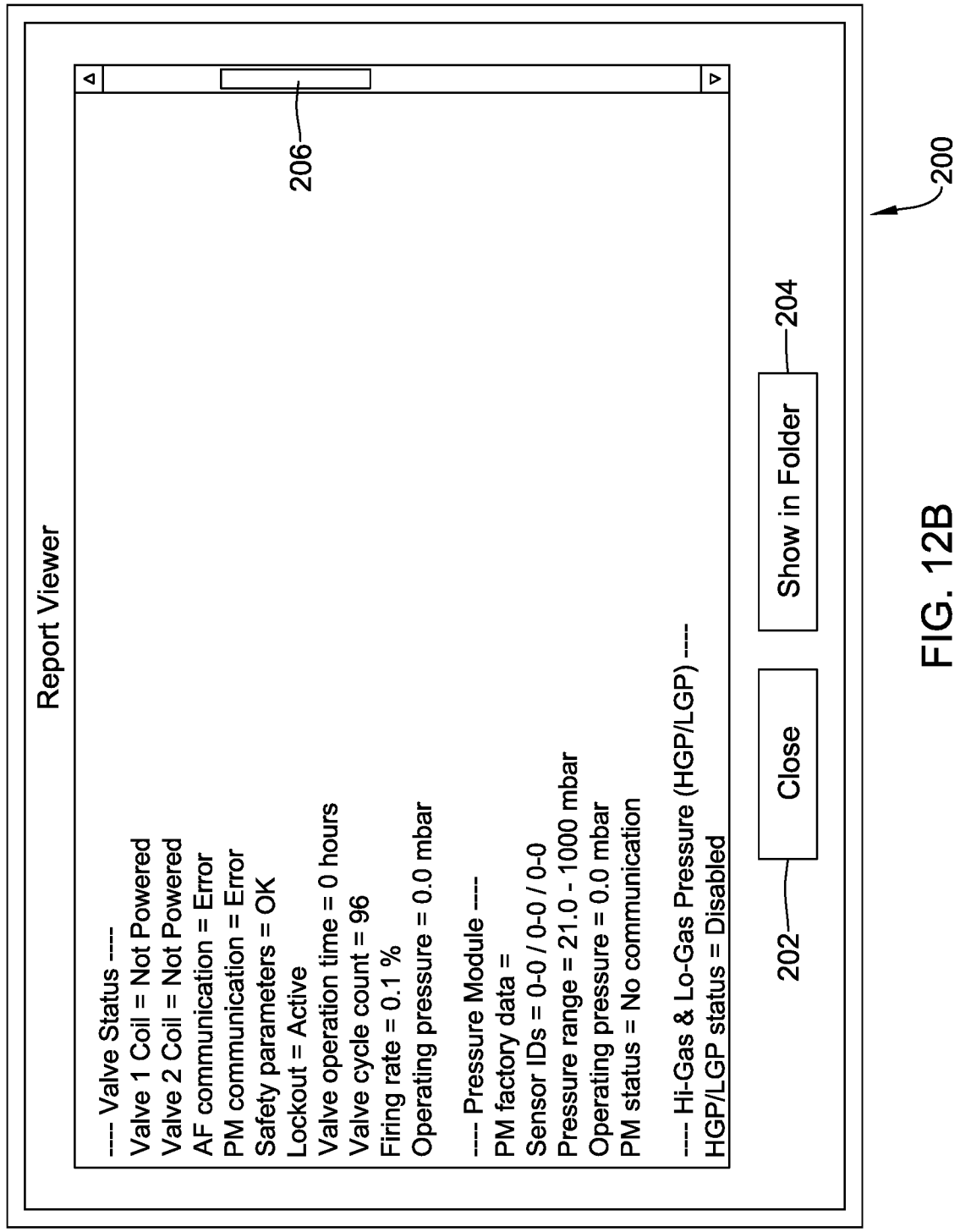
Figure 12C:
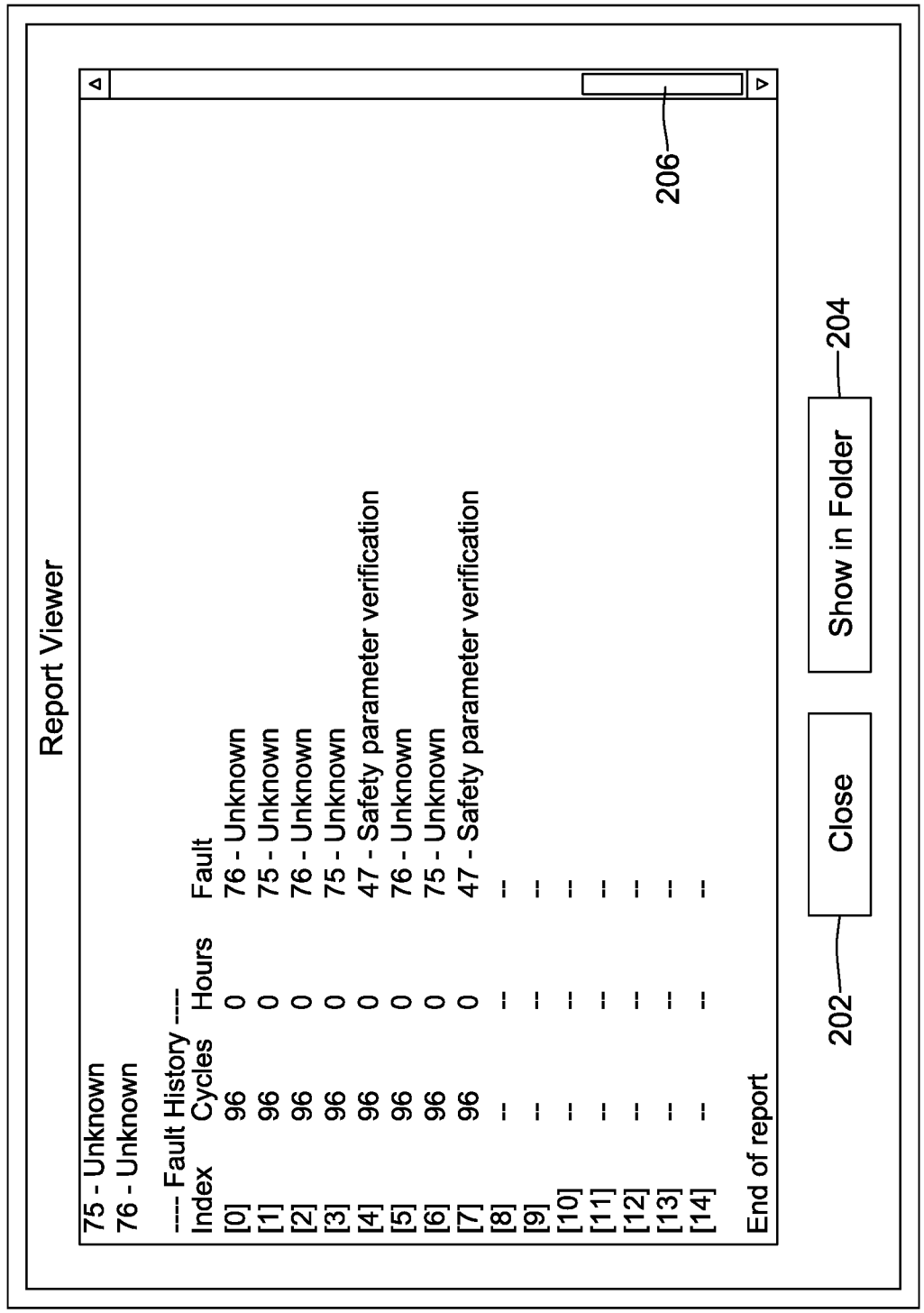

FIGS. 12A-12C depict a Report Viewer screen 200 that may be depicted when a report is selected for viewing. The Report Viewer screen 200 may have a display section displaying the selected report with a scroll bar 206 to scroll the display section vertically (as shown in FIGS. 12A-12C) and/or horizontally (not shown).

In some cases, the Report Viewer screen 200 may include one or more buttons. In the example Report Viewer screen 200 depicted in FIGS. 12A-12C, the Report Viewer screen 200 may include a Close button 202 for closing the selected report and a Show in Folder button 204 to show and/or save the selected report in a folder, along with one or more other buttons.

Although screens are not depicted in the figures that result from selecting the Active Faults button 172 or the Fault History button 174, such screens may take a similar general layout as the Trends screen 180 and the Reports screen 182. The screen resulting from selecting the Active Faults button 172 may depict a list of current faults of the valve assembly 10, optionally a history and/or trend section related to any active faults of the valve assembly 10, optionally one or more selectable features for taking action with or on a selected active fault, and/or optionally other sections.

The screen resulting from selecting the Fault History button 174 may depict a list of past faults organized chronologically, by fault type, and/or by one or more other categories. Additionally or alternatively, the screen resulting from selecting the Fault History button 174 may optionally include a trend section related to one or more of the listed past faults or groups of the past results, one or more selectable features for taking an action for analysis of the listed faults and/or other sections.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A valve assembly having a gas inlet and a gas outlet, the valve assembly comprising:
    a first valve fluidly coupled to the gas inlet;
    a second valve downstream of the first valve, operatively coupled to the gas outlet;
    a pressure sensor positioned to sense a pressure in an intermediate volume between the first valve and the second valve,
    a controller operatively coupled to the first valve, the second valve and the pressure sensor;
    the controller is configured to open the first valve and the second valve to allow gas to flow from the gas inlet to the gas outlet, and close one or more of the first valve and the second valve to prevent gas from flowing from the gas inlet to the gas outlet;

the controller is further configured to execute a valve leak test, which comprises:
  closing the first valve and opening the second valve;
  with the first valve still closed, closing the second valve for a first predetermined amount of time;
  monitoring for a first valve leak rate during the first predetermined amount of time by monitoring the pressure in the intermediate volume;
a human machine interface (HMI) operatively coupled to the controller, the human machine interface including a user interface with a display; and
once the valve leak test has is initiated, the HMI displays on the display a graph of the pressure in the intermediate volume over time covering at least part of the initiated valve leak test.

2. The valve assembly of claim 1, wherein the valve leak test further comprises:
  closing the second valve and opening the first valve;
  with the second valve still closed, closing the first valve for a second predetermined amount of time; and
  monitoring for a second valve leak rate during the second predetermined amount of time by monitoring the pressure in the intermediate volume.

3. The valve assembly of claim 1, wherein after the valve leak test is initiated, the HMI displays on the display the current positions of the first valve and the second valve during the valve leak test.

4. The valve assembly of claim 1, wherein after the valve leak test is initiated, the HMI displays on the display a measure related to the first valve leak rate in number of bubbles.

5. The valve assembly of claim 1, wherein the HMI including a valve leak test start selection that when selected by a user initiates the valve leak test and causes a valve leakage test monitoring screen to be displayed on the display, wherein the valve leakage test monitoring screen displays the graph of the pressure in the intermediate volume over time, the valve leakage test monitoring screen also including test status region spaced from the graph that displays a current status of the on-going valve leak test in a text format while the controller is executing the valve leak test.

6. The valve assembly of claim 1, wherein after the valve leak test is initiated, the HMI displays on the display a table of the pressure in the intermediate volume over time.

7. The valve assembly of claim 1, wherein the HMI is operatively coupled to the controller via a wired connection.

8. The valve assembly of claim 1, wherein the HMI is operatively coupled to the controller via a wireless connection.

9. The valve assembly of claim 1, wherein the valve leak test comprises a plurality of discrete test phases, wherein after the valve leak test is initiated, the HMI updates a current status of the on-going valve leak test while the controller is executing the valve leak test, and the HMI displays on the display the current status in a text format.

10. The valve assembly of claim 9, wherein the current status identifies a pressure stabilization phase of the plurality of discrete test phases of the valve leak test.

11. The valve assembly of claim 9, wherein the current status identifies a leakage rate verification phase of the plurality of discrete test phases of the valve leak test.

12. The valve assembly of claim 9, wherein the current status identifies whether the valve leak test passed or failed.

13. A human machine interface (HMI) for interacting with a valve assembly to initiate and monitor a valve test on the valve assembly, wherein the valve assembly is fitted to regulate a flow of gas to a combustion chamber or burner, the human machine interface (HMI) comprising:
  an interface for sending and receiving information;
  a memory;
  a user interface including a display; and
  a HMI controller operatively coupled with the interface, the memory, and the user interface, the HMI controller is configured to:
    receive an initiation of a test for the valve assembly via the user interface;
    send a signal to the valve assembly over the interface in response to receiving the initiation of the test for the valve assembly, wherein the signal is configured to initiate the valve test on the valve assembly that is fitted to regulate a flow of gas to the combustion chamber or burner, the valve test including two or more sequential test steps; and
    display a valve test monitoring screen on the display after initiation of the test, the valve test monitoring screen including a test status portion that displays in a text format a current test step of the two or more sequential test steps that is currently being performed as well as at least one completed test step, if any.

14. The human machine interface (HMI) of claim 13, wherein the user interface includes a start button and a selection of the start button initiates sending the signal to initiate the valve test on the valve assembly.

15. The human machine interface (HMI) of claim 13, wherein after the valve test is initiated, the HMI controller is configured to display on the display a current position of a valve of the valve assembly during the valve test.

16. The human machine interface (HMI) of claim 13, wherein the test status portion displays a result and/or a current status of the current test step and at least one completed test step.

17. The human machine interface (HMI) of claim 13, wherein after the valve test is initiated, the HMI controller is configured to update the test status portion of the valve test monitoring screen during the on-going valve test.

18. The human machine interface (HMI) of claim 17, wherein the valve test includes a valve leak test, and wherein one of the two or more sequential test steps includes a pressure stabilization step.

19. The human machine interface (HMI) of claim 17, wherein the valve test includes a valve leak test, and wherein one of the two or more sequential test steps includes a leakage rate verification step.

20. A method of initiating a valve leakage test on a gas valve assembly coupled to a non-switched gas source that is under a positive pressure during the valve leakage test, the gas valve assembly having a first valve that is fluidly coupled to the gas source, a second valve downstream of the first valve, and a pressure sensor, where the pressure sensor is positioned to sense a measure that is related to a pressure in an intermediate volume between the first valve and the second valve, the method comprising:
  initiating a valve leakage test of the gas valve assembly by a user selecting a start button on a user interface of a HMI;
  receiving results of the valve leakage test in real time and displaying the received results of the valve leakage test on a display of the HMI during the valve leakage test, the results of the valve leakage test including a valve leakage rate; and
  displaying a diagnostics screen via the HMI, wherein the diagnostic screen includes an active faults selectable option and a trends selectable option, wherein selection of the active faults selectable options results in displaying an active faults list for the gas valve assembly, and selection the trends selectable option results in displaying a trend over time for the valve leakage rate based on past valve leakage tests.

\* \* \* \* \*